US012686234B2

(12) United States Patent
Laitila et al.

(10) Patent No.: US 12,686,234 B2
(45) Date of Patent: Jul. 21, 2026

(54) STUDDED WINTER TIRE

(71) Applicant: NOKIAN RENKAAT OYJ, Nokia (FI)

(72) Inventors: Aappo Laitila, Nokia (FI); Mikko Liukkula, Nokia (FI)

(73) Assignee: NOKIAN RENKAAT OYJ, Nokia (FI)

( * ) Notice: Subject to any disclaimer, the term of this patent is extended or adjusted under 35 U.S.C. 154(b) by 0 days.

(21) Appl. No.: 18/657,495

(22) Filed: May 7, 2024

(65) Prior Publication Data

US 2024/0375451 A1 Nov. 14, 2024

(30) Foreign Application Priority Data

May 8, 2023 (FI) ...................................... 20235510

(51) Int. Cl.
B60C 11/16 (2006.01)
B29D 30/66 (2006.01)
(Continued)

(52) U.S. Cl.
CPC .............. B60C 11/16 (2013.01); B29D 30/66 (2013.01); B60C 1/0016 (2013.01); (Continued)

(58) Field of Classification Search
CPC .......... B60C 2009/0475; B60C 9/0042; B60C 9/005; B60C 9/08; B60C 11/005; (Continued)

(56) References Cited

U.S. PATENT DOCUMENTS

| | | | |
|---|---|---|---|
| 4,832,103 A | 5/1989 | Slivka | |
| 2010/0263781 A1* | 10/2010 | Yamaguchi | D02G 3/48 |
| | | | 152/556 |

(Continued)

FOREIGN PATENT DOCUMENTS

| | | |
|---|---|---|
| DE | 4208861 A1 | 9/1993 |
| EP | 3243644 A1 | 11/2017 |

(Continued)

OTHER PUBLICATIONS

English machine translation of JP-2021030765-A (Year: 2021).*

(Continued)

*Primary Examiner* — Robert C Dye

(74) *Attorney, Agent, or Firm* — Meunier Carlin & Curfman LLC

(57) ABSTRACT

The invention relates to a method for manufacturing a studded pneumatic tire, the method comprising steps of producing an annular carcass by providing a first ply material comprising first cords), wherein the first cords comprise aramid, aramid content of the first cords being at least 50 wt. % of total weight of the first cords, winding at least a layer of the first ply material onto a carcass drum, thereby forming a cylindrical carcass preform, arranging two cables to the cylindrical carcass preform, and expanding the preform, thereby forming the annular carcass, forming a preassembly of belts and a tread, arranging the preassembly of belts and a tread onto the annular carcass to form a preform, vulcanizing the preform, and installing studs. The invention further relates to a studded pneumatic tire.

16 Claims, 6 Drawing Sheets

(51) Int. Cl.

| | |
|---|---|
| *B60C 1/00* | (2006.01) |
| *B60C 11/00* | (2006.01) |
| *B60C 9/00* | (2006.01) |
| *B60C 9/02* | (2006.01) |
| *B60C 9/04* | (2006.01) |

(52) U.S. Cl.

CPC ........ *B60C 11/005* (2013.01); *B60C 11/1618* (2013.01); *B29D 2030/662* (2013.01); *B60C 9/005* (2013.01); *B60C 2009/0269* (2013.01); *B60C 2009/0475* (2013.01); *B60C 2011/0016* (2013.01); *B60C 2011/0025* (2013.01); *B60C 2011/0033* (2013.01)

(58) Field of Classification Search

CPC ..... B60C 11/16; B60C 11/1618; B29D 30/66; B29D 2030/662

See application file for complete search history.

(56) References Cited

U.S. PATENT DOCUMENTS

| | | | | |
|---|---|---|---|---|
| 2011/0308687 | A1* | 12/2011 | Pagano | B60C 11/14 152/548 |
| 2014/0338806 | A1 | 11/2014 | Fabing et al. | |

| | | | | |
|---|---|---|---|---|
| 2015/0031792 | A1* | 1/2015 | Dunlavy | C08F 36/06 523/157 |
| 2023/0072567 | A1* | 3/2023 | Suzuki | B60C 11/005 |
| 2024/0059101 | A1* | 2/2024 | Fujishiro | B60C 9/08 |

FOREIGN PATENT DOCUMENTS

| | | | | | |
|---|---|---|---|---|---|
| EP | 3950387 | A1 | * | 2/2022 | ........... B60C 11/005 |
| EP | 4052927 | A1 | * | 9/2022 | .............. B60C 1/00 |
| JP | 2015039898 | A | * | 3/2015 | |
| JP | 2021030765 | A | * | 3/2021 | |
| KR | 20090114609 | A | * | 11/2009 | |
| WO | 9854007 | A1 | | 12/1998 | |

OTHER PUBLICATIONS

English machine translation of KR-20090114609-A (Year: 2009).*

English machine translation of JP-2015039898-A. (Year: 2015).*

European Search Report for Application No. EP 24173865.7 dated Oct. 7, 2024.

Finnish Search Report in Application No. 20235510, dated Dec. 1, 2023, 2 pages.

Finnish Office Action in Application No. 20235510, dated Dec. 1, 2023, 8 pages.

* cited by examiner

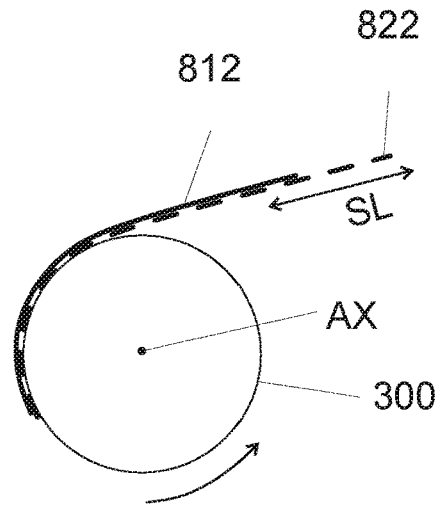
Fig. 2a1
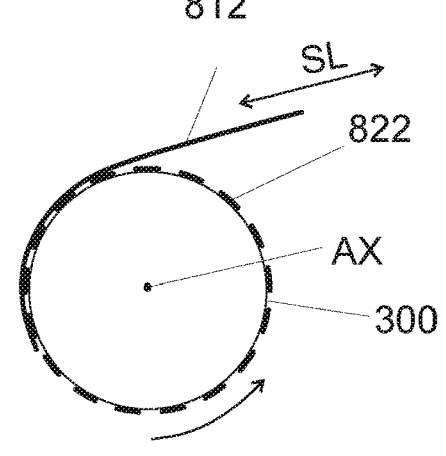
Fig. 2a2
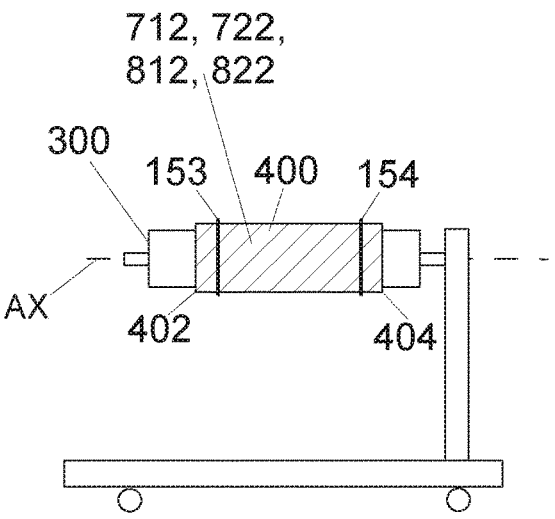
Fig. 2b
Fig. 2c
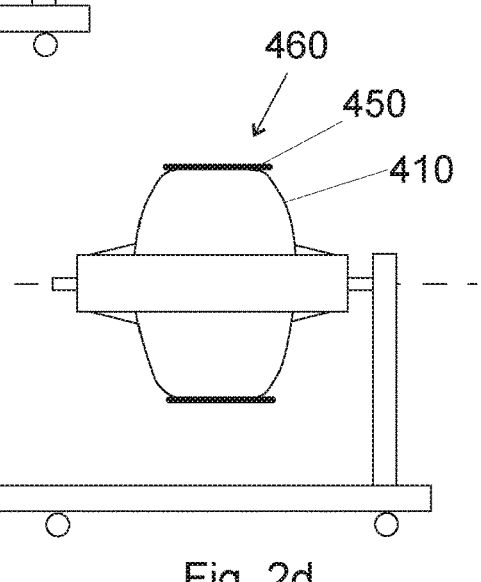
Fig. 2d

STUDDED WINTER TIRE

PRIORITY

This application claims priority to the Finnish national application FI20235510, filed on May 8, 2023, the contents of which is incorporated herein by reference its entirety.

TECHNICAL FIELD

The invention relates to studded pneumatic tires for vehicles. The invention relates to a method for manufacturing studded pneumatic tires for vehicles.

BACKGROUND

Pneumatic tires are commonly used in vehicles. Tires typically comprise a tread, which is designed to provide a running surface of the tire for ground-contacting purposes.

It is known to install anti-skid studs particularly in winter tires developed for snowy and icy roads. An anti-skid stud typically comprises a body of the anti-skid stud and a pin of the anti-skid stud. The pin of the anti-skid stud, or a part of it, is intended to be in contact with the ground surface. The function of the studs is to penetrate to the ice and thereby to form a mechanical bond between the ground surface and the tire, particularly for situations in which a sufficient result is not provided merely by the rubber of the tire and the pattern formed in it.

SUMMARY

It is an aim of this specification to provide a studded pneumatic tire for a vehicle. It is an aim of this specification to provide a method for manufacturing a studded pneumatic tire for a vehicle.

Aspects of the invention are characterized by what is stated in the independent claims. Some preferred embodiments are disclosed in the dependent claims. These and other embodiments are disclosed in the description and figures.

Temperature may change from freezing to warm during spring. Furthermore, when autumn is turning into winter, roads are often wet. Thus, when the temperature drops e.g. during nighttime, road surfaces can freeze. Thus, on one day, roads can be icy, and another day roads can be unfrozen. Furthermore, it is possible that roads change from icy surfaces into dry and unfrozen surfaces within the daytime. Thus, it has been difficult to obtain tires having good grip on icy surfaces without wearing roads too much when roads are unfrozen.

Winter tires can have a softer tread layer rubber composition than summer tires. Further, winter tires can have a tread structure designed for winter conditions. Only some winter tires are studded tires, i.e., tires having plurality of studs having pins penetrating into ice on a road surface. Thanks to the studs having pins, increased traction is provided when the road surface is icy. However, road wear can be increased due to the studs.

The tire according to this specification is a studded pneumatic tire comprising a circumferential tread which is configured to form contact with a driving surface when the tire is used. The term "studded" refers to a tread provided with anti-skid studs.

It has been found that an underlayer whose hardness and stiffness are substantially dependent on the ambient temperature can involve a variety of advantages.

Stiffening and hardening of the underlayer can increase the impact force of the anti-skid stud because the anti-skid stud thus cannot substantially retract into the tread of the tire, whereby the penetration of the stud into the ice is greater and the grip of the tire can be significantly better. A stiffer underlayer provides the stud with more support, whereby grip in icy conditions can be substantially improved as the temperature drops. In warm conditions, the underlayer can substantially soften, whereby the underlayer can allow the stud body to retract into the tread of the tire, whereby it can reduce the stud's impact force and thereby reduce the wear of the road.

However, when the underlayer substantially softens in warm conditions, a stability of the tire and hence handling properties of the tire may decrease at some content. Surprisingly, by using at least one ply primarily comprising aramid based cords together with the underlayer, road wear can be reduced, and the noise level can be lowered in warm conditions while the handling properties can be maintained at the desired level. For obtaining the desired stability for tires having the underlayer, the cords preferably have an aramid content of more than 45 wt. %, more preferably equal to or more than 50 wt. %. The aramid is preferably in the cords in a form of filaments.

Preferably, the tire has at least one ply. If the tire has two plies, the plies can be arranged in such a way that, in the bead area, first ply is arranged crosswise with respect to second ply. This can further stiffen the tire having the underlayer.

A method for manufacturing a studded pneumatic tire can comprise
  producing an annular carcass by
    providing a first ply material, the first ply material extending in a longitudinal direction, having a first width in a transversal direction perpendicular to the longitudinal direction, and comprising first cords extending in a direction forming a first angle of at most 10 degrees, preferably at most 5 degrees, with the transversal direction,
    wherein the first cords comprise aramid, aramid content of the first cords preferably being at least 50 wt. % of total weight of the first cords,
    winding at least a layer of the first ply material onto a carcass drum such that the transversal direction is parallel to the axis of rotation of the carcass drum, thereby forming a cylindrical carcass preform,
    arranging two cables to the cylindrical carcass preform, and
    expanding the preform, thereby forming the annular carcass,
  forming a preassembly of belts and a tread comprising
    at least one metal belt,
    optionally at least one textile belt,
    the underlayer, and
    the cap layer,
  arranging the preassembly of belts and a tread onto the annular carcass to form a preform,
  vulcanizing the preform, and
  installing studs.
The steps of producing the annular carcass can further comprise:
  providing a second ply material, the second ply material extending in the longitudinal direction, having a second width in the transversal direction, and comprising second cords extending in a direction forming a second angle $\alpha 2$ of at most 10 degrees, preferably at most 5 degrees, with the transversal direction, wherein the second cords comprise aramid, aramid content of the second cords being preferably at least 50 wt. % of total weight of the first cords, and winding at least a layer of the second ply material onto a carcass drum so that the second direction forms a third angle $\alpha3$ with the first direction, wherein the third angle $\alpha3$ is less than 20 degrees.

A studded pneumatic tire according to this specification can comprise sidewalls, and bead areas, wherein cables are arranged in the bead areas, a carcass having a first ply material, wherein the first ply material comprises first cords extending within the first ply material in a first direction that depends on a location within the tire, wherein the first direction forms a first angle $\alpha1$ with the direction of the axis of rotation in the tread, wherein the first angle $\alpha1$ is at most 10 degrees, preferably at most 5 degrees, wherein the first cords comprise aramid, aramid content of the first cords preferably being at least 50 wt. % of total weight of the first cords, and at least one metal belt on the outermost ply layer, optionally, at least one textile belt on the outermost metal belt, an underlayer on the outermost belt layer, a cap layer, and anti-skid studs.

The tire can further comprise a second ply material arranged in such a way that, the first ply material radially surrounds the second ply material in the tread, wherein the second ply material comprises second cords extending within the second ply material in a second direction at the location within the tread, the second direction forming a second angle $\alpha2$ with the direction of the axis of rotation (AX) and the second direction forming a third angle $\alpha3$ with the first direction, wherein the second angle $\alpha2$ is at most 10 degrees, preferably at most 5 degrees, and the third angle $\alpha3$ is at most 20 degrees, preferably at most at most 10 degrees, and wherein the second cords comprise aramid, aramid content of the second cords preferably being at least 50 wt. % of total weight of the second cords.

In an embodiment, dynamic stiffness (E*, MPa) of the underlayer is configured to be less than 25 MPa, preferably from 5 to 20 MPa, determined at 20° C., and preferably, dynamic stiffness (E*, MPa) of the underlayer, determined at 0° C., is configured to be at least 2 times the dynamic stiffness of the underlayer determined at 20° C., determined according to ISO 4664-1:2011 in compression. Technical effect is that the winter grip properties of the winter tire can be substantially improved while road wear can be reduced at warmer temperatures. Further, stopping distance needed by the studded tire under certain conditions can be substantially reduced.

In an embodiment, the dynamic stiffness (E*, MPa) of the underlayer is configured to be less than 25 MPa, preferably from 5 to 20 MPa, determined at 20° C., and the dynamic stiffness (E*, MPa) of the underlayer determined at −25° C., is configured to be at least 20 times the dynamic stiffness of the underlayer determined at +20° C., determined according to the standard 4664-1:2011 in compression. Technical effect is that ice grip properties of the tire can be substantially improved, and, for example, the braking distance needed by the winter tire under certain conditions can be substantially reduced. Further technical effect is to decrease road wear at warmer temperatures.

In an embodiment, a position of a tan delta maximum of the underlayer and/or the first rubber compound is configured to be between −10° C. and +15° C., determined according to ISO 4664-1:2011 in compression. Technical effect is that in warm conditions, the underlayer can substantially soften, whereby the underlayer can allow the stud body to retract into the tread of the tire, whereby it can reduce the stud's dynamic impact and thereby reduce the wear of the road.

An average thickness of the underlayer can be at least 0.5 mm and not greater than 8 mm. Technical effect is that the underlayer having said thickness can allow the stud body to retract into the tread of the tire.

The underlayer can comprise, for example, natural rubber (NR) from 0 to 50 phr, and/or butadiene rubber (BR) from 0 to 30 phr, and/or synthetic isoprene rubber (IR) from 0 to 50 phr, a total amount of (natural rubber, butadiene rubber and synthetic isoprene rubber) being from 0 to 70 phr, preferably from 30 to 60 phr, solution polymerized styrene-butadiene rubber (SSBR) from 30 to 100 phr, preferably from 40 to 70 phr, reinforcing fillers from 5 to 70 phr, and one or more resins from 5 to 40 phr.

Technical effect is that by using said contents, tan delta peak can be efficiently adjusted to a desired temperature range, improving properties of the underlayer.

Preferably, the aramid of the cords is selected from para-aramids. Technical effects include improving strength-to-weight properties of the cords.

The first ply material can further comprise a coating, and a content of the coating is from 2 to 6% by weight, determined from a total weight of the cords of the first ply material. The coating composition can be selected, for example, from compositions comprising latex and resins. Preferably, the coating composition is selected from RFL compositions, i.e., compositions comprising resorcinol-formaldehyde latex. Technical effect is to improve adhesion of the aramid based cords to rubber.

If the tire comprises the second ply material comprising aramid based cords and a coating, the second ply can have a coating layer on the cords, wherein a content of the coating is from 2 to 6% by weight, determined from a total weight of the cords of the second ply material.

In an embodiment, the tire further comprises an intermediate layer arranged, at least partially, between the underlayer and the cap layer.

In an embodiment comprising the intermediate layer, optionally, a dynamic stiffness of the intermediate layer is configured to from 25 to 100 MPa, determined at a temperature of 20° C., and at a temperature of 0° C., the dynamic stiffness (E*, MPa) is configured to be from 1 to 1.5 times said dynamic stiffness of the intermediate layer determined at the temperature of 20° C., determined according to the standard ISO 4664-1:2011 in compression. The values can be determined from rubber compounds using a sample having a diameter of 10.0 mm and a height of 10.0 mm. Technical effect is that the intermediate layer supports the whole tire together with the aramid based cords, as well as the studs of the tire at the warmer temperature.

The first cords can comprise, in addition to the aramid, polyethylene terephthalate (PET). In this embodiment, a content of polyethylene terephthalate (PET) is preferably equal to or less than 50 wt. % of total weight of the first cords. Further, a total content of aramid and PET is preferably at least 90 wt. % of total weight of the first cords. Technical effect of PET is to improve easiness of manufacturing process e.g. by decreasing stiffness of the cords, while the aramid content of at least 45 wt. % provides better handling properties for the tire.

In an embodiment, hardness (ShA) of the underlayer is configured to be in a range between 45 ShA and 65 ShA, determined at an ambient temperature of 23° C. according to standard ASTM D2240-15. Thus, the elasticity of the underlayer can be at a particularly appropriate level so that the wear of the road surface can be reduced, while the aramid based cords supports the structure of the tire.

Thus, the tire according to this specification is a studded pneumatic tire comprising
    the ply comprising aramid,
    at least one metal belt,
    the underlayer, and
    the cap layer.

Thanks to the invention, it is possible to decrease road wear by using the underlayer. Surprisingly, by using aramid based cords together with the underlayer, road wear can be reduced while stability and handling properties of the studded tire can be at desired level.

BRIEF DESCRIPTION OF THE DRAWINGS

In the following, the invention will be illustrated by drawings in which
FIGS. 2a1 and 2a2 show winding ply materials onto a carcass drum,
FIG. 2b shows a tubular carcass on the carcass drum,
FIG. 2c shows a cross section of the tubular carcass,
FIG. 2d shows an annular carcass formed by expanding the tubular carcass on the carcass drum, and a preassembly of belts and a tread on the annular carcass.

6

Figure 1A:
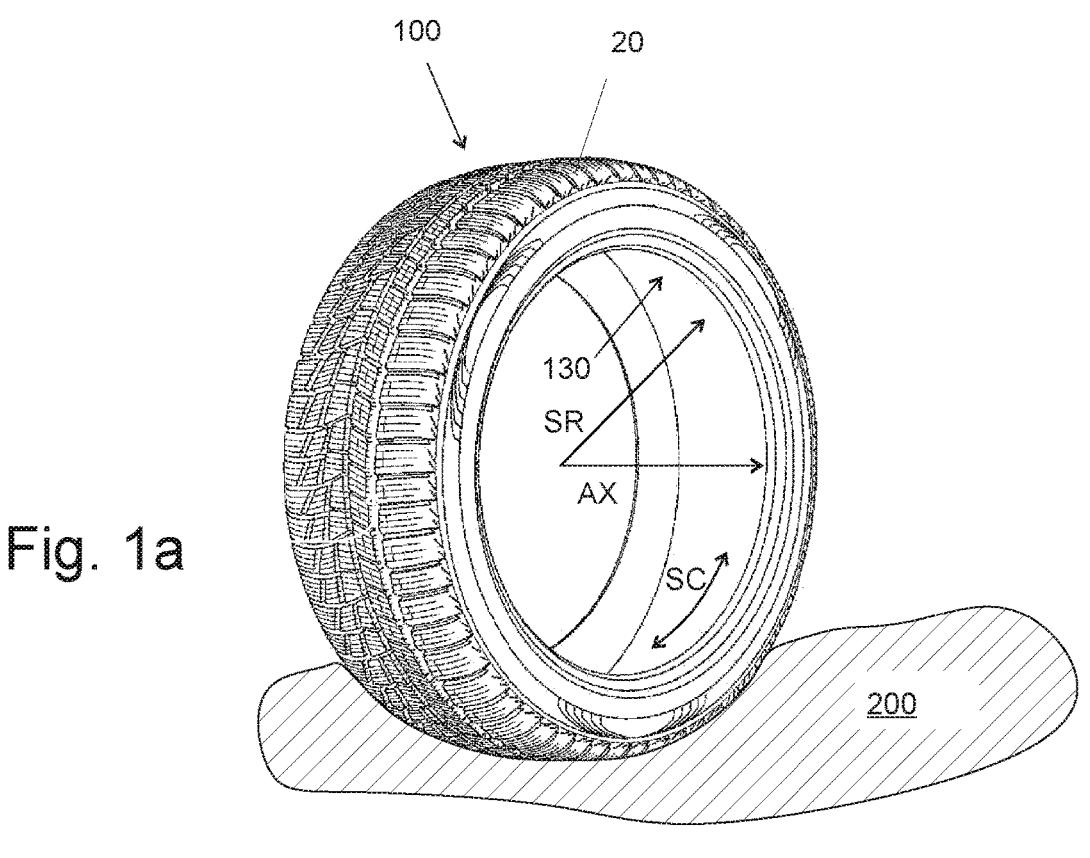
FIG. 1a illustrates an example of a tire.

The figures are illustrations which may not be in scale. Similar parts are indicated in the figures by the same reference numbers.

DETAILED DESCRIPTION

All embodiments in this application are presented as illustrative examples, and they should not be considered limiting.

The following reference numerals are used in this application:
    10 anti-skid stud,
    11 pin of the anti-skid stud,
    12 upper flange of the anti-skid stud,
    13 waist of the anti-skid stud,
    14 bottom flange of the anti-skid stud,
    20 tread of tire,
    21 underlayer,
    21t thickness of the underlayer,
    22 intermediate layer,
    22t thickness of the intermediate layer,
    23 cap layer,
    23t thickness of the cap layer,
    100 tire,
    130 inner surface of the tire,
    131 an innerliner,
    132 first sidewall,
    134 second sidewall,
    151 first bead region of the tire,
    152 second bead region of the tire,
    153 first cable,
    154 second cable,
    200 contact surface, such as a road,
    284 textile belt,
    286 second metal belt,
    287 first metal belt,
    300 carcass drum,
    400 tubular carcass preform,
    402 first boundary,
    404 second boundary,
    410 annular carcass,
    415 bead area of a carcass,
    450 preassembly of belts and tread,
    460 preform, i.e., a green tire,
    712 first ply,
    722 second ply,
    715 inner layer of the first ply material 812,
    716 outer layer of the first ply material 812,
    725' inner layer of the second ply material 822,
    726 outer layer of the second ply material 822,
    727 boundary of the outer layer of the first ply material,
    812 first ply material,
    814 first cords,
    822 second ply material,
    824 second cords,
    826, 828 boundary of the second ply material,
    α1 first angle, defining an angle between first direction and the transversal direction ST,
    α2 second angle, defining an angle between second direction and the transversal direction ST, α3 third angle, defining an angle between the first direction and the second direction,
    d1 first distance, defining a distance wherein an outer layer 726 of the second ply material extends from the boundary 727 of the outer layer 726 of the first ply material 822 along a sidewall 132, W1 first width, defining width of the first ply material, W2 second width, defining width of the second ply material, AX axis of rotation, SC circumferential direction, ST transversal direction, parallel to the first width, SL longitudinal direction, SR radial direction, CL circumferential central line, and EP equatorial plane.

In this application, the term "tire" refers to a winter tire for a vehicle. The winter tire is a studded pneumatic tire for a car or a van. The tire comprises a tread provided with anti-skid studs.

In particular, the tyre may be a tyre for a vehicle of class M1 or N1 as defined in the Consolidated Resolution on the Construction of Vehicles (R.E.3), document ECE/TRANS/WP.29/78/Rev.4, para. 2. These classes are:

M1: Vehicles used for the carriage of passengers and comprising not more than eight seats in addition to the driver's seat, and N1: Vehicles used for the carriage of goods and having a maximum mass not exceeding 3.5 tonnes.

In this specification, the term "phr" relates to parts by weight of an ingredient per 100 parts by weight of rubber, unless otherwise indicated.

In this specification, the term "carbon black" is used to refer to rubber reinforcing carbon blacks unless otherwise indicated.

In this specification, the term "SBR" refers to styrene butadiene rubber.

In this specification, the term "ESBR" refers to emulsion polymerized styrene butadiene rubber.

In this specification, the term "SSBR" refers to solution polymerized styrene butadiene rubber.

In this specification, the term "BR" refers to butadiene rubber.

In this specification, the term "NR" refers to natural rubber.

Natural rubber can be obtained by harvesting e.g. rubber trees (*Hevea brasiliensis*) or non-rubber trees such as guayule or dandelion, e.g. *Taraxacum koksaghyg.*

Natural rubber can be a cis-1,4 polyisoprene, wherein the cis-1,4 content in the natural rubber is greater than 99% by weight.

In this specification, the term "IR refers to synthetic isoprene rubber.

A synthetic isoprene rubber (IR) has similar molecular structure as natural rubber and is very much like natural rubber but made synthetically. The natural rubber can be replaced with the synthetic isoprene rubber and still maintain the technical effects of the natural rubber. Thus, in all embodiments of this specification, from 0 to 100 wt. % of the natural rubber NR can be replaced with the synthetic isoprene rubber IR.

The term "aramid" refers to aromatic polyamide.

In this specification, the term "cord" refers to a long structure, which has relatively small cross section. The cord can be composed of filaments. The term "filament" refers to a fiber of great length. For example, a single filament can be continuous over the tire structure it is applied.

In this specification, the term "web" refers to rollable (i.e., windable) material. The cords of the ply materials do not necessarily form a network.

In this specification, the term "dtex" refers to grams per 10 000 meters of cord.

In this specification, the term "EPDM" refers to Ends Per Decimeter and is known to a person skilled in the art.

The term "Tg" refers to a glass transition temperature.

Glass transition temperature Tg for resins can be determined as a peak midpoint by a differential scanning calorimeter (DSC) at a temperature rate of increase of 10° C. per minute, according to ASTM D6604 (or equivalent).

The term "tan delta" refers to tan 5.

The term "tan delta curve" refers to a curve showing a ratio of loss modulus to storage modulus.

The terms "tan delta maximum" refers to a maximum value of a tan delta curve, which can be determined from a tan delta curve.

The term "position of tan delta maximum" refers to a temperature in which the maximum value of a tan delta curve is obtained. Thus, "position of tan delta maximum" can be determined, for example, as a position of maximum tan delta value of the tan 5 curve.

The term "tan delta peak" refers to a peak of a tan delta curve, the peak showing maximum values and temperatures associated therein.

In this specification, the term Dynamic stiffness (E*) refers to the complex normal modulus (i.e., dynamic modulus of elasticity E*) of the material which can be determined by DMTA test according to the standard ISO 4664-1:2011. The Dynamic stiffness (E*) can be used to determine a stiffness of the material. Unless otherwise indicated, a tan delta curve is determined with Dynamic Mechanical Thermal Analysis (DMTA) as a loss tangent (E"/E') from a cylindric sample in compression. The tan delta curve can be determined by using a temperature range from −60° C. to 70° C., a heating rate of 2° K/min and a 10 Hz frequency. The values can be determined from rubber compounds of a tire as well as from rubber compounds to be used for a tire, before forming the tire. The sample has dimensions of diameter 4.5 mm×height 5.0 mm, when determined from a tire. Further, the sample has dimensions of diameter 10.0 mm×height 10.0 mm, when determined from a rubber compound.

Thus, the values for tan delta curve of this specification can be determined as follows: Dynamic Mechanical Thermal Analysis ("DMTA") tests provide information about the small-strain mechanical response of the samples as a function of temperature. Sample specimens can be tested using a commercially available DMTA equipment in compression mode according to ISO 4664-1:2011. The specimen is cooled to −60° C. and then heated to 70° C. at a rate of 2° C./min while subjected to an oscillatory deformation at 0.6% dynamic strain with 3.0% static strain and a frequency of 10 Hz, when using a sample having a diameter of 4.5 mm and a height of 5.0 mm, and an oscillatory deformation at 0.05% dynamic strain with 0.2% static strain and a frequency of 10 Hz, when using a sample having a diameter of 10.0 mm and a height of 10.0 mm.

The output of the DMTA test is the storage modulus (E') and the loss modulus (E"). The storage modulus indicates the elastic response or the ability of the material to store energy, and the loss modulus indicates the viscous response or the ability of the material to dissipate energy. The ratio of E"/E', called tan delta, gives a measure of the damping ability of the material; peaks in tan delta are associated with relaxation modes for the material, such as glass transition.

The dynamic modulus of elasticity E* (MPa) can be defined by the equation $E^*=E'+iE''$, with:

E': real part of E*,

E' characterizing the stiffness or the viscoelastic behavior of the composition (i.e. the energy stored and totally restored);

i=√−1, and

E": imaginary part of E*, E" characterizing the viscous behavior of the composition.

In this specification, the term hardness (ShA) refers to Shore A hardness which can be determined according to the standard ASTM D2240-15. An exception to the standard, hardness can be measured for materials of different temperatures. The material to be measured is first tempered at the reference temperature by keeping the material to be measured at the reference temperature for a time given in Table 1 before the measurements.

TABLE 1

Tempering of a sample before hardness measurement.

| Sample Thickness (mm) | Temperature (° C.) | | | | | | | | | | |
|---|---|---|---|---|---|---|---|---|---|---|---|
| | −50 to less than −40 | −40 to less than −25 | −25 to less than −10 | −10 to less than −5 | −5 to less than 0 | 0 to less than 5 | 5 to less than 10 | 10 to less than 25 | 25 to less than 40 | 40 to less than 60 | 60 |
| | Time (min) to balance | | | | | | | | | | |
| 10 | 45 | 45 | 40 | 35 | 35 | 30 | 35 | 35 | 35 | 35 | 45 |
| 8 | 35 | 35 | 30 | 30 | 30 | 25 | 30 | 30 | 30 | 30 | 35 |
| 5 | 20 | 20 | 20 | 20 | 20 | 15 | 20 | 20 | 20 | 20 | 20 |
| 3 | 15 | 15 | 15 | 15 | 15 | 10 | 10 | 10 | 10 | 10 | 10 |
| 2 | 10 | 10 | 10 | 10 | 10 | 10 | 10 | 10 | 10 | 10 | 10 |

Winter Tire

The winter tire 100 is a studded pneumatic tire. Thus, the tire 100 comprises studs 10, which have been installed into at least some of the tread blocks. In the tire, at least the pins of the studs are exposed on the tread.

Thus, the winter tire 100 comprises a tread 20, which is in contact with a surface 200 such as a road surface during the normal use of the tire 100. Such a tread 20 typically comprises a tread pattern which comprises a plurality of tread blocks.

An area of the contact of the tread 20 with the surface 200 forms a contact patch. Typically, the contact patches of the tires 100 are the only connections between the road and the motor vehicle.

As illustrated in FIGS. 1a-d, the tire can comprise a circumferential tread 20 which is being configured to form a contact with a surface 200 when the tire 100 is used, a first bead region 151 and a second bead region 152, which bead regions 151, 152 are spaced apart, wherein the bead regions have mounting surfaces adapted for mounting the tire on a rim of a wheel, wherein each bead region 151, 152 has a cable 153, 154, and sidewalls 132, 134, i.e., a first sidewall extending between the first bead region and the tread, and a second sidewall extending between the second bead region and the tread.

As is known, the tire 100 rotates around an axis of rotation AX.

The tire comprises a first cable 153 arranged in the first bead region 151. The tire comprises a second cable 154 arranged in the second bead region 152.

The sidewalls 132,134 connect the bead regions 151, 152 to the tread 20. The sidewalls may have various markings indicating the tire size, tire speed class, tire purpose (winter/summer), tire manufacturer and/or tire name.

The tread 20 can be provided as an outermost layer of a carcass of the studded tire 100. In addition to the tread 20 of the tire 100, the structure of the tire also affects the handling properties of the tire 100.

Figure 1B:
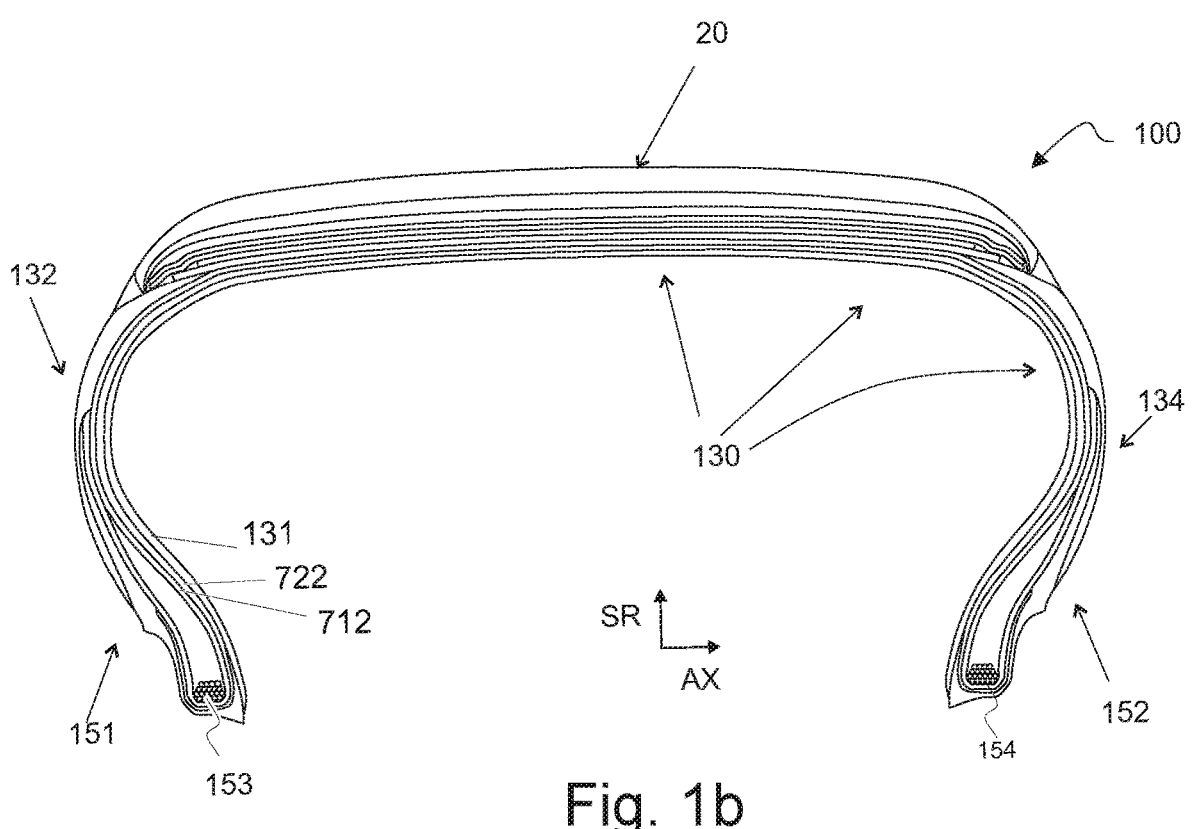
FIG. 1b illustrates, in a half cross section, an example of a tire.
Figure 1C:
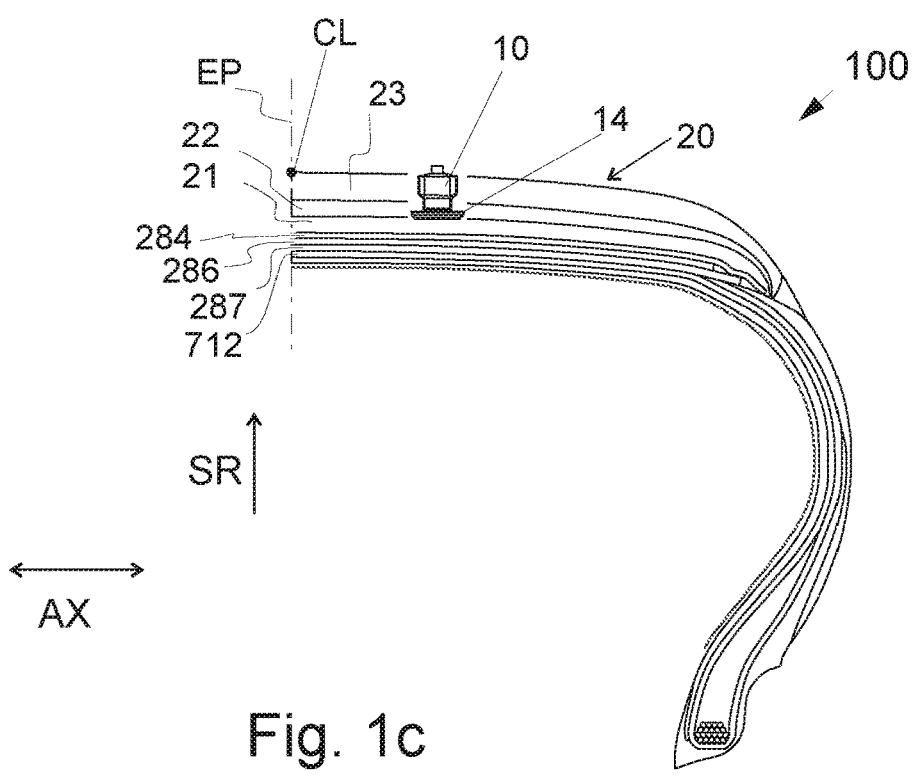
FIG. 1c illustrates, in a quarter cross section, an example of a tire.

A quarter of a cross-section of a tire 100 is shown in FIG. 1c. The cross-section of the tire 100 comprises the axis of rotation of the tire AX, which is parallel to the axial direction and located in the center defined by the tire 100. Such cross-section has two parts, which are substantially identical. An equatorial plane EP of the tire 100 divides the tire to two equally large parts. The circumferential central line CL defined above is arranged in the equatorial plane EP.

The studded tire 100 comprises one or more layers of reinforcing belts. The reinforcing belts can include at least one metal layer and optionally at least one textile layer.

Thus, the tire 100 comprises a first metal belt 287. The tire can also comprise a second metal belt 286. The metal belt(s) 287, 286 can be resilient metal belts, such as steel belts comprising wires.

Preferably, the tire further comprises a textile belt 284, such as a textile belt 284 comprising fibrous polyamide, such as Nylon, aramid, or Cordura. Technical effect is to prevent tire to expand in radial direction during service, improve handling and grip properties of the tire. In an embodiment, the tire may further comprise a second textile belt.

The tire 100 further comprises at least one ply 712, 722. The tire can comprise only one ply 712, 722.

In an embodiment, the tire comprises the first ply 712 and a second ply 722. In this embodiment, the tire may comprise only two plies 712, 722.

Further, as indicated in FIG. 1b, an innerliner 131 can be arranged on the inner side of the carcass.

Preferably, the tire comprises the tread 20, the first ply 712, the second ply 722, the first metal belt 287, and optionally the second metal belt 286 and/or the textile belt 284. Technical effect is to reduce road wear while obtaining desired ice grip and handling properties for the studded tire.

Figures 3A, 3B, 3C:
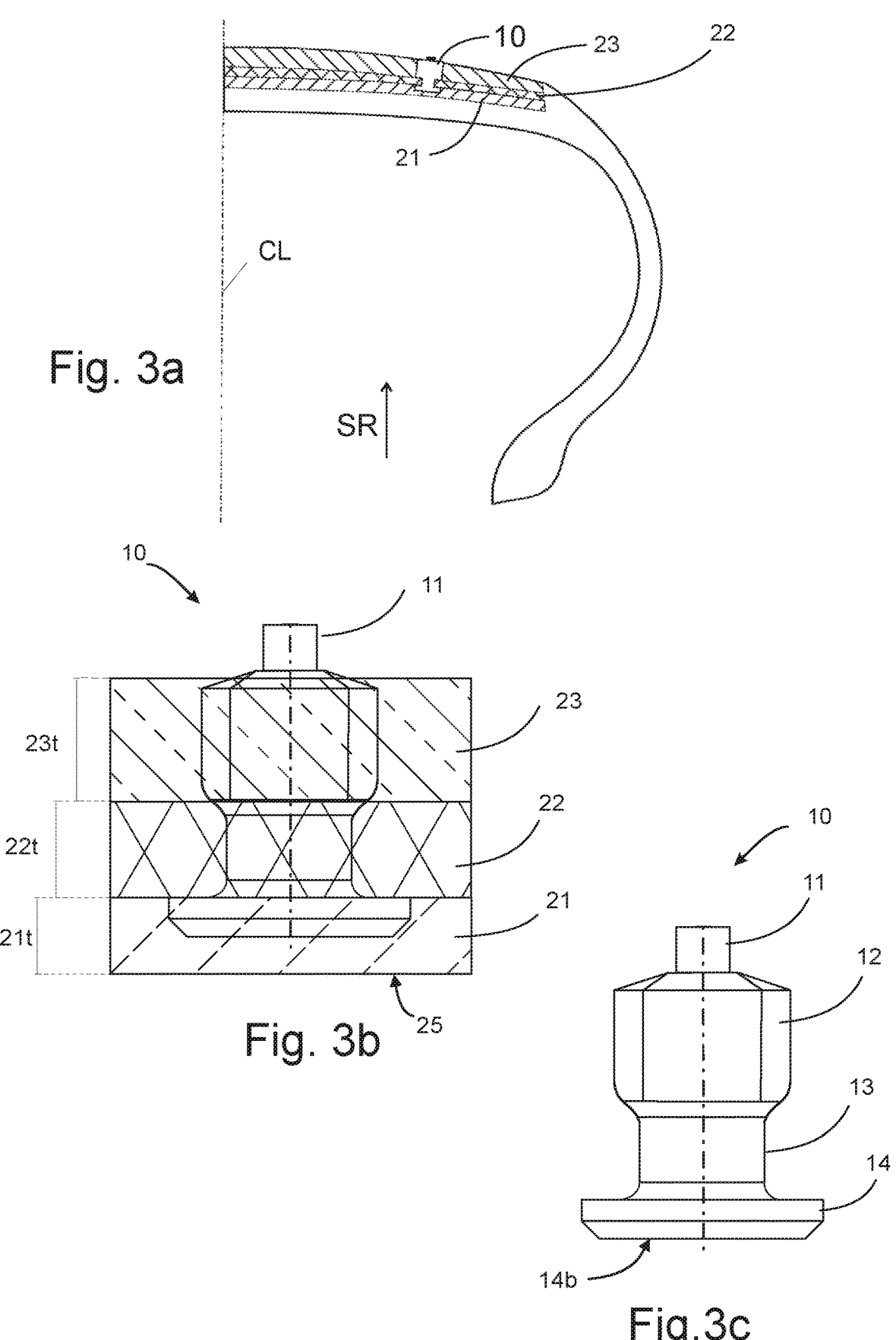
FIGS. 3a-b illustrate example locations of an anti-skid stud, an underlayer, an intermediate layer, and a cap layer.
FIG. 3c illustrates an anti-skid stud according to an example.

Referring to FIG. 3a, the tread 20 comprises a running surface, which is in contact with a surface 200 such as a road surface during the normal use of the tire 100.

The cap layer 23 form at least part of the running surface of the tread. Under the cap layer 23, the tire comprises the underlayer 21. Optionally, an intermediate layer 22 can be arranged in between the underlayer 21 and the cap layer 23.

Preferably, the studs 10 are arranged to contact the underlayer 21. Preferably the bottom flanges of the studs are partly in the underlayer. The stud holes may e.g. penetrate into the underlayer 21. Thus, the stud holes preferably penetrate through the cap layer 23.

The tire 100 can further comprise an electrically conductive portion, such as a rubber member, extending in the radial direction of the tire from the running surface.

FIGS. 3a-3b show some exemplary locations for the underlayer 21, the optional intermediate layer 22, and the cap layer 23 of the tire. Thus, the pneumatic tire can comprise the underlayer 21, optionally, the intermediate layer 22, and the cap layer 23.

If the tire comprises the intermediate layer, at least part of the intermediate layer is arranged between the cap layer 23 and the underlayer 21.

Referring to FIGS. 3a and 3b, the anti-skid stud 10 can be arranged in the studded tire 100 to be substantially surrounded by the combination of the underlayer 21, the cap layer 23 and optionally the intermediate layer 22. Technical effect is that the cap layer and the intermediate layer can support the body of the stud and improve anti-skid stud retention in the tire. In an embodiment, the tire does not comprise the intermediate layer, and the anti-skid stud 10 can be arranged in the studded tire 100 to be substantially surrounded by the combination of the underlayer 21 and the cap layer 23.

Preferably, the rubber based layers 21, 22, 23 surround at least 90%, more preferably from 93 to 100%, of the body of the anti-skid stud 10 determined in the direction of axis of rotation of tire AX of the tire.

The bottom flange of the anti-skid stud can substantially lie on the underlayer 21, and the waist 13 of the anti-skid stud can be substantially surrounded by the cap layer and/or the intermediate layer. Technical effect is that the anti-skid stud can retract when the road surfaces are not frozen, and simultaneously the intermediate layer can support the waist of the stud and improve the holding of the anti-skid stud in place.

Ply Comprising Aramid Based Cords

FIG. 1b shows an example of a tire in a half cross section, and FIG. 1c shows an example of a tire in a quarter cross section.

The tire according to this specification comprises at least one ply 712, 722. The tire according to this specification can comprise only one ply.

The tire can comprise at least two plies 712, 722. The tire can comprise only one ply or only two plies 712, 722.

The at least one ply 712, 722 has cords 814, 824 comprising aromatic polyamide (aramid). The tire according to this specification further comprises the underlayer 21.

Technical effect is to provide such a studded tire that reduces road wear while maintains desired handling properties.

The carcass can comprise, as an innermost layer, an innerliner 131, typically made of a polymer. The innerliner 131 is free from cords.

In contrast to the innerliner 131, which is free from cords, the plies 712, 722 comprise cords.

At least one ply of the studded tire has aramid based cords 814, 824. Amount of aramid, determined from all cords 814, 824 of the ply/plies, is preferably at least 50% by weight. Thus, the cords 814, 824 can have an aramid content of at least 50 wt. %. Technical effect is that aramid cords provide desired stability and handling properties for studded tires having reduced road wear.

Aramids comprise para-aramids (polyparaphenylene terephthalamide) and meta-aramids (polymetaphenylene isophthalamide). The para-aramids and meta-aramids have different linkage positions. Para-aramids have linkages at positions 1 and 4 of rings, while meta-aramids have linkages at positions of 1 and 3.

The aramid according to this specification is preferably selected from para-aramids. Technical effects of para-aramids include great strength to weight ratio of cords. Another technical effect is that the cords reinforce the ply efficiently for the studded tire having the underlayer, improving handling properties of the tire comprising an underlayer.

In addition to the aramid, the first ply and/or the second ply can comprise polyethylene terephthalate (PET). An amount of the polyethylene terephthalate is preferably equal to or less than 55% by weight, such as from 30 to 55% by weight, preferably from 40 to 50% by weight determined from all cords of the ply/plies. Technical effect of PET is to improve easiness of manufacturing process e.g. by decreasing stiffness of the cords, while the aramid content of at least 45 wt. % provides better handling properties for the tire as well as other desired effects of aramid cords.

A total amount of (polyaramide and polyethylene terephthalate) is preferably at least 90 wt. %, and more preferably at least 95 wt. %, and up to 100 wt. %, calculated from the total weight of the cords. Technical effect of cords at least primarily made of aramid (and optionally PET) is to improve easiness of manufacturing process e.g. by decreasing stiffness of the cords, while the aramid content of at least 45 wt. % provides better handling properties for the tire as well as other desired effects of aramid cords.

Thus, preferably, the cords of the at least one ply, preferably the cords of the plies, comprise at least 45 wt. %, preferably at least 50% by weight of aramid and equal to or less than 50% by weight of polyethylene terephthalate so that the total amount of the aramid and the polyethylene terephthalate is at least 90 wt. %. Technical effect is to maintain dimensional stability of the tire e.g. against forces caused by the pressurized inner volume of the tire. Another technical effect is that the cords stiffen the tire and provide desired support for the tire having the underlayer, but still allow the ply to bend as desired during manufacturing process of the tire.

Thus, the tire comprises at least one ply having cords comprising at least 50% by weight of aramid(s). Most preferably, cords of each ply comprise at least 50% by weight of aramid(s).

Preferably, the cords are made of filaments having a length of several decimeters or meters, such as for example at least 50 cm.

The cords comprising the aramid fiber can be 0.4 mm—1.0 mm in diameter. Thus, a diameter of each cord can be, for example, in a range between 0.4 mm and 1.0 mm, preferably in a range between 0.5 mm and 0.7 mm. The technical effects include, for example, obtaining desired strength properties and dimensional stability and improved handling for tires having the underlayer and cords comprising at least 45 wt. % of aramid.

The dtex value of the cords is preferably in the range from 1000 dtex to 3400 dtex, more preferably from 1200 dtex to 2500 dtex, and most preferably from 1350 dtex to 2000 dtex. Technical effect is that individual cords comprising at least 45 wt. % of aramid, wherein individual cords have the defined dtex value, have produced particularly good results for tires. The technical effects include, for example, obtaining desired strength properties and dimensional stability and improved handling for tires having the underlayer.

The cords are preferably multifilament cords. A number of the cords in the ply, measured as a total end count, can be in a range between 70-130 EPDM, preferably from 80 to 120 EPDM. Technical effect is to further enhance the effect of aramid cords on the tire. The term "EPDM" refers to Ends Per Decimeter and is known to a person skilled in the art.

Advantageously, the cords comprise, primarily comprise, or consist of multifilament cords. Preferably, the cords are multifilament cords having from 500 to 2000 filaments per cord. Preferably, the cords have equal to or more than 550 filaments per cord, more preferably equal to or more than 600 filaments per cord and, furthermore, the cords preferably have equal to or less than 1500 filaments per cord, and more preferably equal to or less than 1000 filaments per cord. The number of filaments has an effect of the properties of the cords. Technical effect of said ranges is to obtain improved dimensional stability and handling properties, without causing problems, for tires having the underlayer and the cords comprising aramid.

In addition to the cords comprising or consisting of aramid, the ply can have a coating composition applied onto surfaces of the cords. Technical effect of the coating composition is to efficiently attach the cords to a rubber.

The coating composition can be selected from compositions comprising latex and resins.

Preferably, the coating composition is selected from RFL compositions, i.e., compositions comprising resorcinol-formaldehyde latex. The term resorcinol-formaldehyde latex RFL is known by a person skilled in the art. Technical effect of RFL is to improve adhesion of the cords to the rubber.

The cords can be arranged adjacent to each other at a distance from each other in such a manner that a matrix material is settled around the cords. Thus, the cords can be surrounded by the matrix material. The matrix material can be arranged around the cords, for example, by calendering. Technical effect of the matrix material is to maintain a desired distance between adjacent cords.

The matrix material can be based on a rubber. Thus, the matrix material can be a rubber material.

In an embodiment, the first ply material 812 can comprise the rubber as a matrix material, and the first cords 814 integrated with the matrix. Furthermore, the first ply material can comprise the coating composition, improving the adhesion of the cord to the rubber.

Further, the second ply material can comprise rubber as a matrix material and second cords 824 integrated with the matrix. Furthermore, the second ply material can comprise the coating composition, improving the adhesion of the cord to the rubber.

The coating composition of the second ply material 822 can be the same as the coating composition of the first ply material 812.

Preferably, the amount of the coating composition, determined from total weight of the first cords, i.e., weight of the cords of the first ply, is from 2 to 6% by weight. Technical effect is that the smaller amount of coating composition may cause poor adhesion between the cord and rubber while greater amount of coating composition may cause poor flexibility for the formed coating layer, which may break the coating layer and hence decrease properties of the tire.

Preferably, the amount of the coating composition, determined from total weight of the second cords, i.e., weight of the cords of the second ply, is from 2 to 6% by weight. Technical effect is that the smaller amount of coating composition may cause poor adhesion between the cord and rubber while greater amount of coating composition may cause poor flexibility for the formed coating layer, which may break the coating layer and hence decrease properties of the tire.

Thus, the studded tire comprises the underlayer 21 and the cap layer, and the material of the first ply 812 can comprise rubber and first cords 814. The first cords 814 can comprise para-aramid.

In an embodiment of a tire, the material of the second ply 822 comprises rubber and second cords 824. The second cords 824 comprise para-aramid.

A discussed, the tire comprises at least one ply. The tire can comprise at least two plies. The tire can comprise only two plies. The tire can comprise only one ply. Technical effect is to obtain the studded tyre having reduced road wear and desired stability and handling properties cost-efficiently.

Figure 1D:
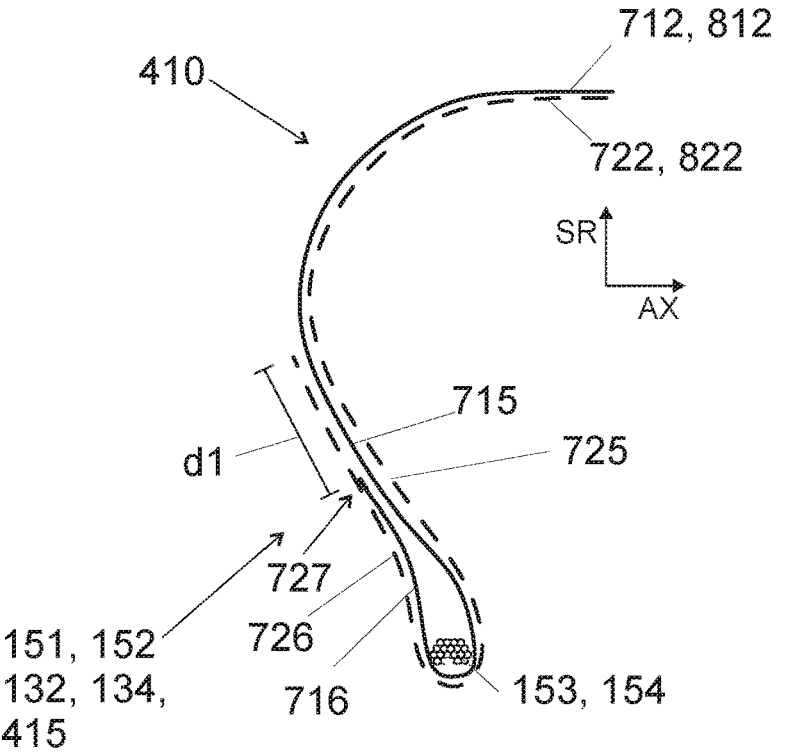
FIG. 1d shows an example of a bead area and a sidewall of a tire or an annular carcass.

FIG. 1d shows a part of an annular carcass 410. The carcass 410 can comprise— an inner 715 and an outer 716 layer of the first ply material 812, and an inner 725 and an outer 726 layer of the second ply material 822 in a bead area 415.

The studded tire 100 can comprise a first ply 712 of first ply material 812 and a second ply 722 of second ply material 822 in such a way, that in the tread, the first ply material 812 radially surrounds the second ply material 822. In the radial direction, the first ply material 812 is next to the second ply material 822.

The outer layer 726 of the second ply material can extend, at a bead area 151, 152, 415 along a sidewall 132, 134 of the studded tire 100 in the outward radial direction, from a boundary 727 of the outer layer 716 of the first ply material. Preferably, the bead area includes an inner 715 and an outer 716 layer of the first ply material 812 and an inner 725 and an outer 726 layer of the second ply material 822. Preferably, all ply materials 812, 822 comprises the aramid. Technical effect is to improve many properties of the studded tire comprising the underlayer, including handling and endurance.

The first ply 712 (and the first ply material 812) can encircle the first cable 153 and the second cable 154. The first ply 712 (and first ply material 812) can extend continuously in between the cables 153, 154. In an embodiment, where the inner 715 and outer 716 layers of the first ply material are in contact, the first ply 712 (and first ply material 812) fully encircles the first cable 153 and the second cable 154. Technical effect is to maintain dimensional stability of the tire e.g. against forces caused by the pressurized inner volume of the tire. Another technical effect is that the cords stiffen the tire and provide desired support for the tire having the underlayer.

In an embodiment, also the second ply 722 and the second ply material 822 encircles the first cable 153 and the second cable 154. Further, the second ply 722 and the second ply material 822 encircles the first ply material 812 that is left in between the cable(s) and the second ply. However, since the layers 715, 716 of the first ply material 812 are left in between the layers 725, 726 of the second ply material 822, the second ply 722 and second ply material 822 only partly encircle the cables 153, 154. However, preferably, the second ply 722 and second ply material 822 encircle by at least 270 degrees each of the cables 153, 154, when the amount of encircling is observed from a cross section of the tire 100 or the annular carcass 410 with a plane including the axis of rotation AX. The second ply 722 and second ply material 822 can encircle, for example, by about 350 degrees the cable 153, 154.

The ply/plies can extend from the outer side of the carcass, via a first cable 153 to the tread 20, and further via a second cable 154 to the opposite outer side of the carcass. Preferably, the ply/plies extend continuously.

The first ply material can be in a form of a first web 812, extending in a longitudinal direction SL, having a first width W1 in a transversal direction ST perpendicular to the longitudinal direction SL.

The second ply material 822 can be in a form of a second web, extending in the longitudinal direction SL, having a second width W2 in the transversal direction ST.

The second width W2, i.e., the width of the web of the second ply material 822 can be less than the first width W1, i.e. the width of the web of the first ply material 812. In an embodiment, the width of the second ply material 822 is at least 10 mm less, preferably at least 20 mm less, and most preferably at least 20 mm less than the width of the first ply material 812. In other words, in an embodiment, W1-W2≥10 mm, preferably, W1-W2≥20 mm or W1-W2≥30 mm. Technical effect is to affect the rigidity of the bead area 151, 152 of the studded pneumatic tire 100.

In an embodiment, the second with W2 is substantially same as the first width W1. Thus, in this embodiment, a difference between the first width W1 and the second width W2 is preferably less than 10 mm. However, preferably, the second width W2 is less than the first width W1.

The first cords of the first ply can be arranged to a first direction.

In an embodiment, the tire comprises only one ply. In this embodiment, the first angle α1 is preferably less than 2 degrees, such as 0 degrees.

If the tire comprises at least two plies, the first angle α1 is preferably more than 0 degrees and at most 10 degrees, more preferably at least 1 degrees.

Thus, the first ply material can comprise first cords 814 extending in the first direction forming a first angle α1 from 0 degrees to 10 degrees, preferably from 0.5 to 8 degrees, more preferably from 1 to 5 degrees, and most preferably from 1.5 to 3 degrees with the transversal direction ST. The first angle α1 may be e.g. from 0.5 to 5 degrees, such as from 1 to 3 degrees.

If the tire comprises two plies 712, 722, the second cords of the second ply can be arranged to a second direction. The second ply material can comprise second cords 824 extending in a direction forming a second angle α2 of more than 0 degrees and at most 10 degrees, preferably from 0.5 to 8 degrees, more preferably from 1 to 5 degrees, and most preferably from 1.5 to 3 degrees with the transversal direction ST. The second angle α2 may be e.g. from 0.5 to 5 degrees, such as from 1 to 3 degrees.

Figures 4A, 4B:
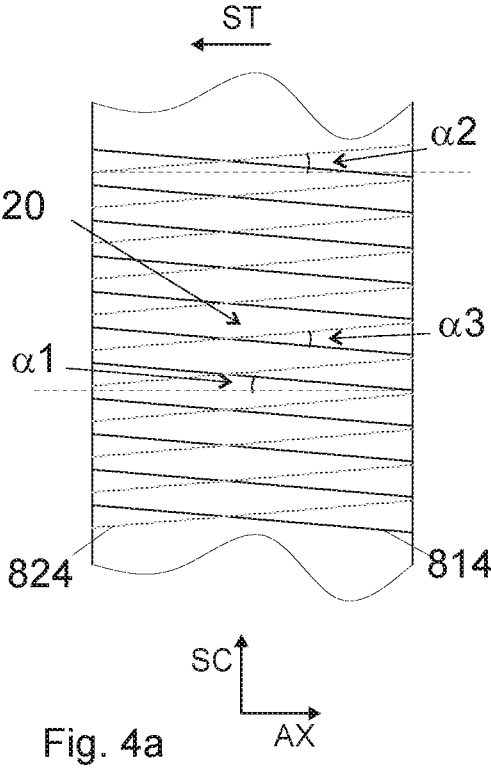
FIG. 4a shows cords of different plies as seen from above.
FIG. 4b shows an arrangement of ply materials during manufacturing of a tire with two layers of ply material.

If the tire has the two plies, the cords of adjacent plies are preferably crossed as shown in FIG. 4b. Thus, the first direction preferably differs from the second direction. Therefore, the second direction forms a third angle with the first direction. The third angle can be 0 to 20 degrees, preferably 2 to 16 degrees, more preferably from 3 to 12 degrees, and most preferably from 4 to 10 degrees. Technical effect is to provide desired reinforcing effect of the cords.

Thus, the first and the second cords are preferably arranged crosswise relative to each other, i.e. the third angle α3 is preferably greater than the second angle α2. The second ply can be arranged, in the radial direction, next to the first ply so that no such material that comprises cords, such as other ply material, is arranged in between said plies.

Thus, the first ply material 812 comprises first cords 814 extending within the first ply material 812 in a first direction that depends on a location within the tire 100. At a point of the tread 20, the first direction forms a first angle α1 with the direction of the axis of rotation AX, as indicated in FIG. 4a. The second ply material 822 comprises second cords 824 extending within the second ply material 822 in a second direction that depends on a location within the tire 100. At the point of the tread 20, the second direction forms a second angle α2 with the direction of the axis of rotation AX and a third angle α3 with the direction to which the first cords 814 of the first ply material 812 extend at that point. As is implicit, the point refers to a point of the tread 20 wherein projections of the first cords and projections of the second cords 824 cross each other, when projected onto the surface of the tire in a radial direction of the tire.

FIG. 2c indicates, how the ply materials 812, 822, may surround each other in the carcass preform 400 or in the tread of the tire 100.

In an embodiment, the first ply material 812 is in contact with the second ply material 822 in such a way that no other material that comprises cords, e.g. other ply material, is arranged in between first ply material 812 and the second ply material 822, at least in the bead area 151, 152, 415.

The tire 100 can comprise, in the bead areas 151, 152,
(i) an inner layer 715 of the first ply material 812,
(ii) an outer layer 716 layer of the first ply material 812,
(iii) an inner 725 layer of the second ply material 822, and
(iv) an outer 726 layer of the second ply material 822.

As indicated above, the materials and their sizes can be selected in such a way that the outer layer 716 of the first ply material 812 extends, along a sidewall 132, 134 in a substantially outward radial direction from a boundary 727 of the outer layer 726 of the second ply material 822. The term "a substantially outward radial direction" refer to a direction that is parallel to a direction of the sidewall 132, 134.

As discussed, the bead area can comprise layers of ply material. At any location, one of the layers is outermost and one is innermost. The outer layer 716 of the first ply material 812 can extend a first distance d1 from the boundary 727 of the outer layer 726 of the second ply material 822 along a sidewall 132. The first distance d1 can be at least 5 mm, preferably at least 10 mm and more preferably at least 15 mm.

Underlayer

The studded tire 1 comprises the underlayer 21. The underlayer 21 can be a circumferential layer. The underlayer 21 can be disposed radially outside an outermost belt of the tire, such as a textile belt 284 or a metal belt 286, 287.

If the tire comprises a textile belt 284, the underlayer 21 can be disposed radially outside the textile belt 284. Technical effect of the textile belt is to restrict expansion from centrifugal forces during high speed driving as well as improve many properties of the tire having the underlayer, including improved handling, grip and aquaplaning for the tire comprising the underlayer.

If the outermost belt of the tire is a metal belt 286, 287, the underlayer 21 can be disposed radially outside the metal belt 286, 287.

By the combined effect of the underlayer, the cords comprising aramid, and optionally an intermediate layer, the dynamic impact of the studs can be particularly well controlled at different ambient temperatures, particularly for tires comprising the at least one metal belt 287, 286 and the at least one textile belt 284.

The underlayer 21 has an inner surface and an outer surface. The outer surface of the underlayer faces the tread 20. The inner surface of the underlayer substantially faces the center of the tire.

The tire can have the underlayer 21 having a hardness which can vary with the ambient temperature. Technical effect is to decrease the road wear of the studded tire but still provide desired winter grip properties in spite of the reduced road wear.

Said underlayer 21 is preferably arranged at least partly below the studs 10. Thus, the studs 10 can be placed at least partly above the underlayer 21. Preferably, the underlayer is arranged to be under each of studs of the winter tire so that the bottom flange of the stud can be pressed against and retract into the underlayer 21. Preferably, a thickness of the underlayer 21 is at least 0.3 mm, determined in the locations of the studs 10.

The stud 10, preferably the bottom flange 14 of the stud, can be in direct contact with the underlayer. Thus, preferably, there is no other material layer between the stud and the underlayer.

The underlayer has an average thickness 21*t*.

In this specification, the term "average thickness" refers to mathematical average thickness, i.e., mean thickness.

The average thickness 21*t* of the underlayer can be at least 0.5 mm, such as between 0.5 mm and 8 mm, more preferably at least 1.0 mm, and most preferably at least 1.5 mm. Furthermore, the average thickness 21*t* of the underlayer can be equal to or less than 8 mm, more preferably equal to or less than 7 mm, and most preferably equal to or less than 6 mm. The average thickness can be, for example, between 1 mm and 6 mm. Technical effect is that the ice grip properties of the stud can be substantially improved at cold weather, and moreover, the road wear at warm weather can be substantially reduced. Moreover, the underlayer of the presented thickness can be compressible to reduce road wear, to reduce tire noise, to improve the driving performance of the tire as well as to keep the pin of the stud protruded from the tread to provide the tire with good grip on an icy driving surface.

A thickness of the underlayer determined from a location of a stud, from a bottom 14*b* of the stud to an inner surface 25 of the underlayer, is preferably at least 0.3 mm, such as between 0.3 mm and 7 mm, more preferably at least 0.6 mm, and most preferably at least 1 mm. Furthermore, the thickness of the underlayer determined from a location of a stud, from a bottom 14*b* of the stud to an inner surface 25 of the underlayer can be equal to or less than 7 mm, more preferably equal to or less than 6.5 mm, and most preferably equal to or less than 6 mm. Technical effect is that the ice grip properties of the stud can be substantially improved at cold weather and the road wear at warm weather can be substantially reduced.

Preferably, the underlayer 21 contains

NR (natural rubber) from 0 to 50 phr, preferable from 10 to 40 phr, and/or BR (butadiene rubber) from 0 to 30 phr, preferable from 10 to 20 phr, and/or IR (synthetic isoprene rubber) from 0 to 50 phr, preferable from 10 to 40 phr, so that a total amount of (NR and BR and IR) is from 0 to 70 phr, SSBR (solution polymerized styrene-butadiene rubber) from 30 to 100 phr, most preferably from 40 to 70 phr, resins from 5 to 40 phr, preferably from 10 to 35 phr, and reinforcing fillers from 35 to 80 phr, wherein a combined amount of carbon black and/or silica is preferably from 35 to 80 phr, more preferably from 40 to 60 phr. Technical effect of materials comprising the rubbers comprising at least 30 phr solution polymerized styrene-butadiene rubber together with the reinforcing filler(s) and the resin(s), and preferably also 10 to 70 phr NR, BR, and/or IR, is to provide particularly desired tan delta curve for the rubber compound.

The underlayer 21 can further contain additives, such as one or more of oils, antidegradants, ZnO, stearic acid, vulcanization chemicals and sulphur.

As discussed, the reinforcing fillers can comprise carbon black, and/or silica.

If the reinforcing fillers comprise silica, silane can be added for improving reinforcing efficiency of the silica. Preferably, a content of the silane is equal to or less than 15% by weight, such as between 5 wt. % and 15 wt. %, determined from total weight of the silica in the underlayer. Technical effect is to provide improved dispersion. Furthermore, silane can form bonds between silica and rubber during the vulcanization.

As discussed, the underlayer 21 preferably contains styrene butadiene rubber which is solution-polymerized styrene butadiene rubber SSBR. The underlayer 21 can comprise at least 30 phr of SSBR. Thus, the content of SSBR in the underlayer 21 can be at least 30 phr, preferably at least 35 phr, more preferably at least 40 phr, and most preferably at least 45 phr. Further, the content of SSBR in the underlayer 21 can be equal to or less than 100 phr, preferably equal to or less than 90 phr, more preferably equal to or less than 80 phr, and still more preferably equal to or less than 70 phr. By using said contents of the solution-polymerized styrene butadiene rubber SSBR, stiffness of the underlayer can be efficiently adjusted as desired.

Microstructure of SSBR has an effect on properties of the SSBR. When preparing the underlayer, the vinyl content of the solution-polymerized styrene butadiene rubber is preferably between 33 mol-% and 65 mol-% relative to butadiene, more preferably between 38 mol-% and 61 mol-% relative to butadiene. Furthermore, the styrene content of the styrene butadiene rubber is preferably between 25% and 45% by weight, most preferably between 27% and 40% by weight, wherein the styrene content is expressed in mass % relative to the whole polymer. The contents can be determined by 1H-NMR method in accordance with ISO 21561-1:2015. This embodiment can provide particularly suitable properties for the underlayer so that stiffening of the underlayer can take place in a controlled manner. Thus, stiffening can take place at a moment determined more precisely in advance.

Preferably, the underlayer contains either NR and SSBR, or BR and SSBR. In these combinations, the technical effect of NR and BR is to improve the elasticity of the underlayer even at cold temperatures. Further, the technical effect of SSBR is to improve stiffness of the mixture.

Thus, in an advantageous embodiment, the underlayer contains 10 to 50 phr, most preferable 10 to 40 phr of NR (natural rubber), and from 30 phr of SSBR, most preferably from 40 to 70 phr SSBR (solution polymerized styrene-butadiene rubber).

Technical effect of said combination of NR and SSBR is that the position of tan delta peak can be efficiently adjusted as desired, and hardness of the underlayer can increase at a desired temperature, particularly when used together with the reinforcing fillers and resins according to this specification. Furthermore, thanks to this combination, elasticity of the underlayer can be maintained at cold temperatures, further improving properties of the underlayer.

It is to be noted that the natural rubber NR can be replaced with a synthetic isoprene rubber and still maintain the technical effects of the natural rubber. The synthetic isoprene rubber IR is very much like natural rubber but made synthetically. Thus, from 0 to 100 wt. % of the natural rubber NR can be replaced with the synthetic isoprene rubber IR.

In an embodiment, the underlayer advantageously contains 10 to 30 phr, most preferable 10-20 phr of polybutadiene rubber, and from 30 phr of SSBR, most preferably from 40 to 70 phr of SSBR (solution polymerized styrene-butadiene rubber).

Technical effect is that properties of the studded tire having the underlayer can be particularly improved and position of the tan delta peak of the underlayer can be easily adjusted by using said amounts of polybutadiene rubber and the solution polymerized styrene-butadiene rubber, particularly when used together with the reinforcing fillers and resins according to this specification.

The underlayer 21 can contain reinforcing fillers. A total amount of the reinforcing fillers is preferably more than 30 phr, more preferably at least 33 phr, still more preferably at least 35 phr, and most preferably at least 40 phr, determined from the underlayer 21. Furthermore, the underlayer 21 can comprise equal to or less than 80 phr of reinforcing fillers, preferably equal to or less than 70 phr of reinforcing fillers, still more preferably equal to or less than 60 phr of reinforcing fillers, and most preferably equal to or less than 55 phr of reinforcing fillers. Technical effect of the reinforcing fillers is that the hardness of the underlayer is easier to optimize to a desired level.

The reinforcing fillers are preferably selected from silica and carbon black. The reinforcement may comprise both silica and carbon black. If the reinforcing fillers comprises silica, also silane is preferably added to the mixture. Technical effect of the reinforcing fillers is to improve the strength of the underlayer. Furthermore, the reinforcing fillers can be used to influence the ShA hardness of the underlayer so that the hardness of the underlayer can be more easily optimized to a desired level.

In a non-limiting embodiment, the carbon black is selected from N375 and N234. These carbon blacks are known by a person skilled in the art.

In an embodiment, silica can be selected from: anhydrous silica prepared by dry process and silica prepared by wet process. Among them, hydrous silica prepared by wet process is preferable because it contains a lot of silanol groups.

In a non-limiting embodiment, the silica is selected from high BET and low BET.

Silane coupling agent can be used for silica to be appropriately dispersed during kneading. Preferably, a content of the silane is between 5 wt. % and 15 wt. %, determined from total weight of the silica in the underlayer. Technical effect it to provide improved dispersion. Furthermore, silane can form bonds between silica and rubber during the vulcanization.

The silane coupling agents can be of any type known to those skilled in the art. For example, at least one of bifunctional organosilane and polyorganosiloxane can be used. "Bifunctional" means a compound having a first functional group capable of interacting with silica, e.g., alkoxy, cycloalkoxy or phenoxy group as a leaving group on the silicon atom, and a second functional group capable of interacting with the double bond of elastomer, e.g., —SCN, —SH, —NH₂ or -Sx—where x=2 to 8. The organosilanes can be chosen from the group consisting of polysulphide organosilanes (symmetrical or asymmetrical) such as bis(3-triethoxysilylpropyl) tetrasulphide, abbreviated as TESPT or bis disulphide-(triethoxysilylpropyl), abbreviated as TESPD, polyorganosiloxanes, mercaptosilanes or blocked mercaptosilanes.

The underlayer 21 can contain oil(s). The amount of oils, if used, can be at least 5 phr, more preferably at least 8 phr, and most preferably at least 10 phr. Further, the amount of oils can be equal to or less than 25 phr, preferably equal to or less than 22 phr, and most preferably equal to or less than 20 phr. Technical effect is to increase processability and adjust hardness of the compound.

The oil(s) is/are preferably selected from the group of:
vegetable oil, such as sunflower oil or rapeseed oil,
TDAE oil (treated distillate aromatic extract),
MES oil (mild extracted solvate), and
RAE oil (residual aromatic extract).

Preferably, said oil contains or consists of at least primarily TDAE oil and/or SRAE oil. Technical effect of oils is to act as process aids and softeners in the manufacturing process.

As discussed, the underlayer 21 can contain one or more resins. A total content of resins is preferably at least 5 phr determined from the underlayer. Technical effect is that the resins can adjust dynamic behavior of the underlayer by shifting and/or broadening the tan delta peak of the rubber compound. Thus, thanks to the resins, position of the tan delta peak can be adjusted in a cost-efficient and controlled manner to a predetermined temperature range.

A total amount of resins can be at least 5 phr, preferably at least 10 phr, more preferably at least 15 phr, and most preferably at least 17 phr, determined from the underlayer. Further, the total amount of resins can be equal to or less than 40 phr, preferably equal to or less than 35 phr, more preferably equal to or less than 30 phr and most preferably equal to or less than 28 phr, determined from the underlayer. Thus, the total amount of resins can be, for example, 5-40 phr, preferably 10-35 phr, and more preferably 15-30 phr, determined from the underlayer. By applying resin, position of tan delta maximum of the underlayer can be raised by a predetermined level so that the hardening of the underlayer can be implemented within a predetermined temperature range. Another technical effect is that by using the preferably ranges, resins affect the rubber compound by shifting and/or broadening the tan delta peak of the rubber compound as desired.

It was noted during experimental tests that properties of tires having cord comprising aramid were particularly improved when the position of tan delta maximum of the underlayer was in a range between 0° C. and 10° C. Thus, preferably, the position of tan delta maximum of the underlayer is in a range between 0° C. and 10° C.

The resin(s) used for the underlayer can have a glass transition temperature higher than 20° C., more preferably higher than 30° C., and most preferably higher than 35° C. Further, the resin(s) used for the underlayer can have a glass transition temperature of less than 110° C., preferably less than 85° C., most preferably less than 70° C. For example, the resin(s) can have a glass transition temperature from 20 to 100° C., preferably from 35 to 60° C. As discussed, Tg for resins can be determined as a peak midpoint by a differential scanning calorimeter (DSC) at a temperature rate of increase of 10° C. per minute, according to ASTM D6604 or equivalent.

Preferably, the one or more resins of the underlayer are selected from the following group:
petroleum hydrocarbon resins,
aromatic vinyl-based resins,
phenol-based resins, terpene resins, terpene phenol resins, rosin derived resins and copolymers, and mixtures and modifications thereof.

Technical effect is to efficiently adjust the tan delta peak maximum temperature to a desired temperature, i.e., to shift a position of tan delta peak to a desirable range.

Most preferably, the one or more resins of the underlayer are selected from rosin-based resins, terpene-based resins, and pure monomer C9 resins (PMR), i.e., aromatic resins based on aromatic feedstocks that have been highly purified prior to polymerization, including copolymers of styrene and α-methylstyrene. Technical effect is to shift tan delta peak position to a desirable temperature range more efficiently.

The underlayer can comprise an aromatic resin. Thus, the resin(s) can contain aromatic groups. In an embodiment, the resins contain more than 4% aromatic groups, more preferably more than 6% aromatic groups. However, the aromatic content is preferably less than 60%, more preferably equal to or less than 54%.

Advantageously, for adjusting the tan delta peak of the underlayer to a desired temperature range in a controlled and precise manner, the underlayer comprises:

solution-polymerized styrene butadiene rubber SSBR, and polybutadiene rubber and/or natural rubber, and/or synthetic isoprene rubber, reinforcing filler(s), and resin(s).

The contents of the materials are preferably in the range defined in this specification.

The underlayer 21 can comprise, primarily comprise, or consist of a material whose tan delta maximum is at a temperature of at least −20° C., for example at least −15° C., preferably at least −12° C., more preferably at least −10° C., or at least −8° C., and most preferably at least −5° C. Furthermore, tan delta maximum of said material can be at a temperature of equal to or less than 20° C., for example not higher than 15° C., preferably not higher than 12° C., more preferably not higher than 10° C., or not higher than 8° C., and most preferably not higher than 5° C. Thus, the hardening of the underlayer can be suitable in view of road wear and winter grip. Technical effect of the preferable ranges is that the hardening of the underlayer can take, more accurately, place at a point optimal in view of road wear and winter grip hence, the stud's dynamic impact of the tire can be controlled easier at different temperatures.

An unvulcanized material of the underlayer can be vulcanized so that sulphur is used as the vulcanizing agent. Intermediate Layer The intermediate layer is an optional layer of the studded tire.

As the cords comprising aramid can support the studded tire having the underlayer, the intermediate layer is not an essential layer of the tire. However, the intermediate layer can provide even more desired properties for studded tires having the underlayer and the cords comprising aramid.

Thus, in an embodiment, the tire further comprises the intermediate layer 22. The intermediate layer 22 can be a circumferential layer.

The intermediate layer 22 can be arranged between the cap layer 23 and the underlayer 21, at least on locations of the studs. Technical effect is that the intermediate layer improves the stability of the tire and supports the studs 10 therein when the underlayer is softening.

Thus, the intermediate layer 22, or at least part of the intermediate layer 22, can be placed between the cap layer 23 and the underlayer 21.

The intermediate layer 22 can support the studs and hence improve driving stability of the tire on a dry road.

An average thickness 22t of the intermediate layer can be at least 0.4 mm and equal to or less than 7 mm, preferably at least 0.6 mm and less than 6.5 mm, more preferably at least 0.7 mm and equal to or less than 6 mm, and most preferably in a range between 0.8 mm and 5 mm. Technical effect is that the intermediate layer can, together with the underlayer, provide the stud with particularly suitable winter grip properties. Thus, the ice grip properties of the tire can be substantially improved. In addition, properties of the tire can be designed as desired more efficiently than in other solutions.

A thickness of the intermediate layer 22, determined at a location wherein the intermediate layer is surrounding a stud, can be at least 0.4 mm and equal to or less than 7 mm, preferably at least 0.5 mm, more preferably at least 0.6 mm and less than 6.5 mm, still more preferably at least 0.7 mm and equal to or less than 6 mm, and most preferably in a range between 0.8 mm and 5 mm. Technical effect is that the intermediate layer can support the stud. Further technical effect is that the intermediate layer can, together with the underlayer, provide the stud with particularly suitable winter grip properties.

As discussed, the intermediate layer 22 is, at least primarily, left in between the cap layer 23 and the underlayer 21. However, the intermediate layer 22 can partially extend to the running surface of the tire, thus forming part of the running surface of the tire.

Thus, the intermediate layer can extend to the running surface. Preferably, the intermediate layer 22 comprises electrically conductive rubber material which makes the contact with the surface 200, such as a road, thereby completing the electrical path of reduced electrical resistivity between the tire mounting surface and tire running surface. As discussed, if the studded tire comprises the intermediate layer, the studs are preferably in a contact with the underlayer, the intermediate layer, and the cap layer. Thus, advantageously, such locations wherein the intermediate layer extends to the running surface of the tire are not having the studs.

If the intermediate layer extends to the running surface, the intermediate layer 22 can cover from 0.02% to 25% of the running surface area, preferably from 0.05% to 22.5% of the running surface area, and more preferably from 0.1% to 20% of the running surface area. In an advantageous embodiment, the intermediate layer covers from 0.5% to 8% of the running surface area. The term "running surface area" refers to the ground contacting area of the tread. Technical effect of said range is to improve handling properties of the tire without substantially affecting other properties of the tire, particularly if the intermediate layer extends to the running surface on a middle area of the tread and/or on shoulder areas of the tread. Furthermore, if the intermediate layer is made of electrically conductive material, another technical effect is to improve electrical conductivity while improving handling properties of the tire.

The intermediate layer can have a greater thickness on shoulder areas and/or on central area, compared to an average thickness of the intermediate layer. Technical effect is to improve handling properties and decrease rolling resistance of the tire.

The intermediate layer can have a greater thickness determined from shoulder areas than an average thickness of the intermediate layer. Technical effect is to improve driving behavior of the tire.

Alternatively or in addition, the intermediate layer can have a greater thickness on a central area of the tread than on the shoulder areas of the tread. In this embodiment, the intermediate layer can extend to the running surface at a central area of the tread. Technical effect is to improve handling properties of the tire as well as decrease rolling resistance of the tire.

In an embodiment, the intermediate layer has a smaller thickness determined from a central area than determined from shoulder areas. In an embodiment, the intermediate layer has a smaller thickness determined from shoulder areas than determined from a central area.

The intermediate layer can extend to the running surface on shoulder areas of the tread and/or extend to the outermost belt layer. Technical effect is to improve handling properties of the tire as well as decrease rolling resistance of the tire. Another technical effect is that the intermediate layer having the greater thickness on shoulder areas of the tread improve driving behavior of the tire. Another technical effect of said greater thickness on shoulder areas of the tread is to improve braking grip of the winter tire while improving handling properties of the tire.

The intermediate layer can comprise or be made of materials selected from a group comprising or consisting of:
    elastomers, for example, SBR, BR, NR,
    fillers, for example silica and/or carbon black, wherein silane is preferably used together with the silica)
    vulcanization chemicals or curing agents, and
    one or more of resins, sulphur, oils, and antidegradants.

In an embodiment, silica may be selected from: anhydrous silica prepared by dry process and silica prepared by wet process. Among them, hydrous silica prepared by wet process is preferable because it contains a lot of silanol groups. Silane coupling agent can be used for silica to be appropriately dispersed during kneading.

If the fillers comprise silica, silane can be added for improving reinforcing efficiency of the silica. Preferably, the content of the silane is equal or less than 15%, such as from 5% to 15% by weight relative to the amount of silica. Technical effect is to improve dispersion, and during the vulcanization silane forms bond between silica and rubber.

The silane coupling agents can be of any type known to those skilled in the art. For example, at least one of bifunctional organosilane and polyorganosiloxane can be used. "Bifunctional" means a compound having a first functional group capable of interacting with silica, e.g., alkoxy, cycloalkoxy or phenoxy group as a leaving group on the silicon atom, and a second functional group capable of interacting with the double bond of elastomer, e.g., —SCN, —SH, —NH$_2$ or -Sx—where x=2 to 8. The organosilanes can be chosen from the group consisting of polysulphide organosilanes (symmetrical or asymmetrical) such as bis(3-triethoxysilylpropyl) tetrasulphide, abbreviated as TESPT or bis disulphide-(triethoxysilylpropyl), abbreviated as TESPD, polyorganosiloxanes, mercaptosilanes or blocked mercaptosilanes.

Most preferably, the intermediate layer comprises
    SBR between 0 phr and 50 phr, such as 20 phr and 50 phr,
    BR between 0 phr and 50 phr, preferably between 10 phr and 35 phr,
    NR and/or IR between 20 phr and 100 phr, so that a total amount of (BR and NR and IR) is from 50 to 100 phr,
    oils between 0 phr and 30 phr, resins between 0 phr and 30 phr,
    fillers between 40 phr and 80 phr, preferably the filler(s) is/are selected from carbon blacks and silicas,
    preferably, additives such as, ZnO, stearic acid, vulcanization chemicals and sulphur, and
    optionally, antidegradants.

As discussed, in an embodiment, the intermediate layer is made of an electrically conductive rubber material.

In an embodiment, the intermediate layer 22 comprises a rubber reinforcing carbon black. Technical effect is to increase stiffness of the intermediate layer while improving electrical conductivity through the tread. The intermediate layer can comprise a rubber reinforcing carbon black content of at least 40 phr, preferably at least 50 phr. Thus, the rubber composition(s) of the intermediate layer 22 can be relatively electrically conductive. Thus, the relatively electrically conductive rubber composition of the intermediate layer can e.g., form a part of the electrically conductive path. Thus, a very small electrical resistance can be obtained through the cap layer.

The intermediate layer 22 can comprise one or more oils. The oil(s) can comprise, for example,
    TDAE oil (treated distillate aromatic extract),
    MES oil (mild extracted solvate),
    RAE oil (residual aromatic extract), and
    vegetable oil, such as sunflower oil or rapeseed oil.
    Preferably, the oil(s) are selected from TDAE and SRAE. The oils can act in the manufacturing process as process aids and softeners.

A total amount of the oils in the intermediate layer 22 can be from 0 to 30 phr.

The resin(s) of the intermediate layer can be selected from the following group:
    petroleum hydrocarbon resin,
    aromatic vinyl-based resin,
    phenol-based resin,
    terpene resin,
    terpene phenol resin,
    rosin derived resins and copolymers, and
    mixtures and modifications thereof.

A total amount of the resins in the intermediate layer 22 can be from 0 phr to 30 phr, preferably 2 to 20 phr. Technical effect of resins is fine tuning stiffness properties of the intermediate layer.

Thanks to the underlayer and the intermediate layer, properties of the tire can be easier to control so that the underlayer can yield to a particularly suitable extent when the ambient temperature rises, which can further reduce wear of the road surface. Further, by the combined technical effect of the intermediate layer and the underlayer, wear of the road surface under non-frozen conditions can be reduced while the underlayer together with the intermediate layer substantially improves winter grip of the tire on an icy road.

Figure 5A:
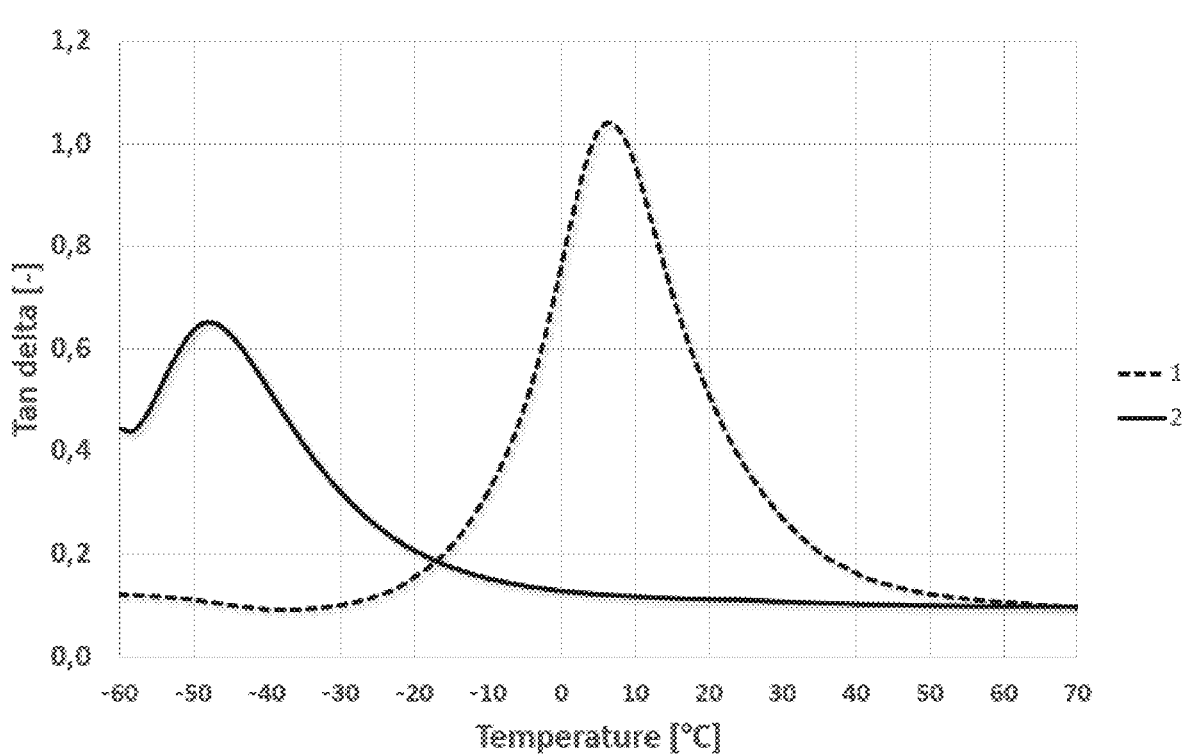
FIG. 5a illustrates an example of a tan delta curve showing a ratio of loss modulus to storage modulus of an underlayer (line 1) and an intermediate layer (line 2) as a function of temperature, determined from −60° C. to +70° C.

Tan delta maximum of a layer can be determined from a tan delta curve. An example is shown in FIG. 5a, illustrating an example of a tan delta curve of an underlayer (line 1) and an intermediate layer (line 2) as a function of temperature, determined from −60° C. to +70° C.

Preferably, the position of tan delta maximum of the intermediate layer is between −40° C. and −60° C. degrees. Thus, if the tire comprises the intermediate layer, the position of tan delta maximum of the intermediate layer differs clearly from the position of tan delta maximum of the underlayer that is preferably between −5° C. and +15° C.
Hardness of Rubber Compounds The term hardness (ShA) refers to Shore A hardness. Hardness (ShA) can be determined from the compound(s). For measuring hardness from a tire, e.g., a tire cut sample can be taken from the tire.

If the tire comprises the intermediate layer, the hardness (ShA) of the intermediate layer can be configured to be greater than hardness of the underlayer at 22° C. Said difference between the underlayer and the intermediate layer is preferably at least 10%, more preferably from 10% to 60%, and most preferably from 11% to 40% so that underlayer is at least 10% softer than the intermediate layer, determined at 22° C. Technical effect is that the underlayer yields to a suitable extent at said ambient temperature, which reduces wear of the road surface, while the ply/plies comprising aramid and the intermediate layer supports the tire.

Hardness (ShA) of the underlayer can be configured to be in a range between 45 ShA and 65 ShA, preferably in a range between 45 ShA and 60 ShA, and most preferably in a range between 45 ShA and 55 ShA, determined at an ambient temperature of +22° C. Thus, the elasticity of the underlayer can be at a particularly appropriate level so that the wear of the road surface can be reduced.

In an embodiment, hardness (ShA) of the intermediate layer is in a range between 66 ShA and 80 ShA, preferably in a range between 70 ShA and 78 ShA, determined at an ambient temperature of 22° C. Thus, the harder intermediate layer together with the cords comprising aramid supports the structure of the tire.

If the tire comprises the underlayer and the intermediate layer, hardness (ShA) difference between the underlayer and the intermediate layer is preferably at least 5%, more preferably from 10% to 60%, still more preferably from 12% to 50%, and most preferably from 15% to 30% so that the underlayer is harder than the intermediate layer, determined at −25° C. Technical effect is that the underlayer and the intermediate layer substantially improves ice grip of the tire on an icy road.

A softer underlayer material can substantially increase the retraction of the stud into the tire at warmer temperatures and thereby reduce road wear and noise. This has an effect on the grip of the tire in cold weather and on road wear in warm weather. Thus, the effects of the underlayer can be particularly advantageous for both cold and warm conditions.

Dynamic Stiffness of the Rubber Compounds

As discussed, the dynamic stiffness can be determined according to standard ISO 4664-1:2011 in compression.

The dynamic stiffness of the underlayer, determined at a temperature of 20° C., can be configured to be less than 25 MPa, preferably from 5 to 20 MPa. Technical effect is to decrease road wear.

If the tire comprises the intermediate layer, the dynamic stiffness of the intermediate layer, determined at a temperature of 20° C., can be configured to be at least 25 MPa, preferably at least 27 MPa, and more preferably from 30 to 100 MPa. Technical effect is that the intermediate layer supports the whole tire and the studs of the tire at the warmer temperature.

The dynamic stiffness of the underlayer, determined at a temperature of 0° C., can be configured to be at least two times the dynamic stiffness of the underlayer at a temperature of 20° C. Technical effect is that the winter grip properties of the winter tire can be substantially improved.

Further, if the tire comprises the intermediate layer, dynamic stiffness of the intermediate layer, determined at a temperature of 0° C., can be configured to be from 1 to 1.5 times, preferably from 1.1 to 1.4 times, the dynamic stiffness of the intermediate layer at a temperature of 20° C. Technical effect is that the intermediate layer supports the whole tire and the studs of the tire at warmer temperatures.

If the tire comprises the underlayer and the intermediate layer, the dynamic stiffness of the underlayer can be at least 100% higher, preferably at least 150% higher than the dynamic stiffness of the intermediate layer at a temperature of 0° C. Technical effect is that the ice grip properties of the winter tire can be substantially improved at 0° C. The dynamic stiffness of the underlayer may further be equal to or less than 1000% higher, such as equal to or less than 900% higher, preferably equal to or less than 580% higher than the dynamic stiffness of the intermediate layer, determined at a temperature of 0° C.

Furthermore, if the tire comprises the underlayer and the intermediate layer, the dynamic stiffness of the intermediate layer can be higher than the dynamic stiffness of the underlayer at a temperatures of at least 5° C., such as at a temperatures of at least 7° C. In a particularly advantageous embodiments, the dynamic stiffness of the intermediate layer is higher than the dynamic stiffness of the underlayer at temperatures from 10° C. to 20° C. Technical effect is to reduce road wear while improving handling properties of the tire. Further technical effect is that the intermediate layer effectively supports the stud.

The dynamic stiffness of the underlayer at −25° C. can be at least 20 times the dynamic stiffness of the underlayer at +20° C. Thus, the grip properties of the studded tire can be substantially improved, and, for example, the braking distance needed by the studded tire under certain conditions can be substantially reduced.

The dynamic stiffness (E*, MPa) of the underlayer can be lower than 25 MPa at an ambient temperature of 20° C.,
  in the range from 25 to 500 MPa, preferably from 40 to 400 MPa, at an ambient temperature of 0° C., and
  at least 500 MPa at an ambient temperature of −30° C.

The change in the dynamic stiffness of the underlayer upon a decrease in the temperature can have a greater impact on the grip of the tire in winter than the change in the hardness of the material upon a decrease in the temperature. For the above-mentioned dynamic stiffness values, the adjustment of the stud's dynamic impact of the tire at different temperatures can be more controllable, and the grip properties of the winter tire can be better optimized for different temperatures. Thanks to the above-mentioned dynamic stiffness, for example the braking distance on an icy road can be substantially reduced.

In a preferred example, for optimizing the grip properties of the studded tire in winter, (A) the hardness (ShA) of the underlayer can be
  lower than 60 ShA and preferably lower than 55 ShA at 20° C., and
  preferably at least 60 ShA, more preferably at least 65 ShA, at 0° C., and
  higher than 75 ShA at −30° C.;
and furthermore,
(B) the dynamic stiffness of the underlayer can be
  lower than 25 MPa at an ambient temperature of 20° C.,
  between 25 MPa and 500 MPa at an ambient temperature of 0° C., and
  at least 500 MPa at an ambient temperature of −30° C.

Figure 5B:
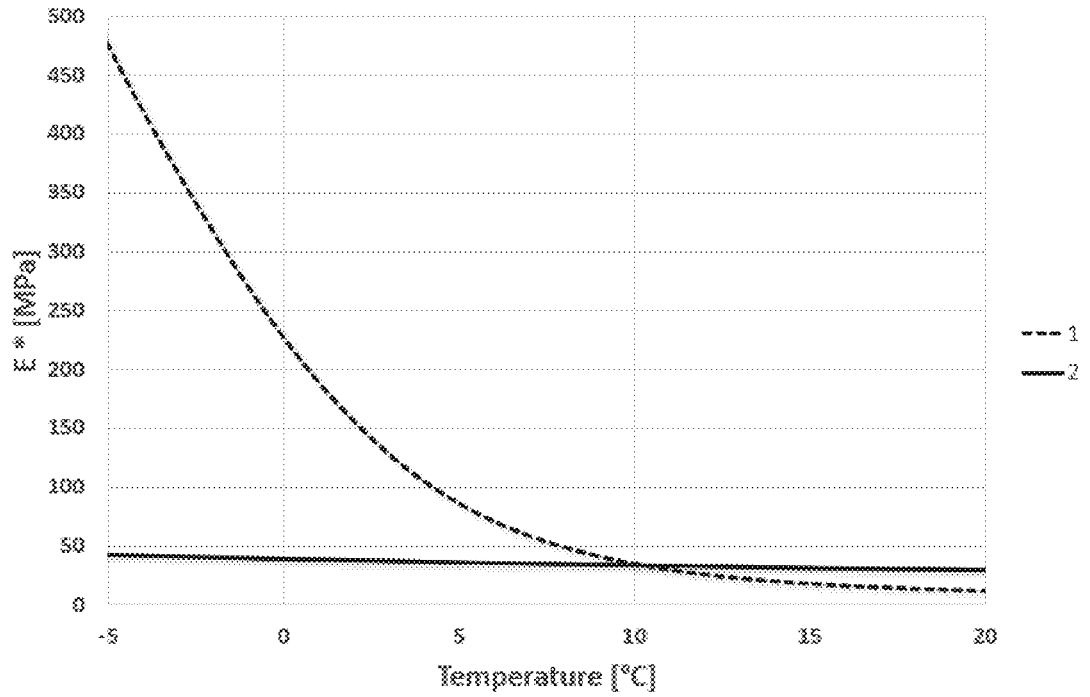
FIG. 5b illustrates dynamic stiffness curves of the underlayer (line 1) and an intermediate layer (line 2) according to an example, as a function of temperature.

During the experimental tests, it was noted that properties of tires having the underlayer and the intermediate layer were particularly improved when a cross point of stiffness curves of the underlayer and the intermediate layer (shown in FIG. 5b) was in a range between +5° C. and 20° C., and particularly when the cross point of stiffness curves was in a range between +7° C. and 13° C. Thus, if the tire comprises the intermediate layer, a cross point of stiffness curves of the underlayer and the intermediate layer is preferably in a range between +5° C. and 20° C., more preferably in a range between +7° C. and 13° C.

In an embodiment, the studded tire comprises the underlayer and the intermediate layer and the dynamic stiffness of the underlayer is higher than the dynamic stiffness of the intermediate layer at temperatures of less than 5° C., but the dynamic stiffness of the intermediate layer is higher than the dynamic stiffness of the underlayer at temperatures from 15° C. to 20° C.

Technical effect is to substantially reduce road wear while improving handling properties of the tire.

Cap Layer

The cap layer 23 forms at least part of the outer surface of the tire, preferably at least 75% of a total surface area of the tread, more preferably from 75% to 99.98%, still more preferably from 77.5% to 99.95%, and most preferably from 80% to 99% of the total surface area of the tread.

A medium thickness 23t of the cap layer can be in a range between 2 mm and 20 mm, preferably from 2.5 mm to 15 mm, and most preferably from 3 mm to 12 mm. Technical effect is to provide a desired thickness for the tread so that winter grip properties of the tire can be maintained at a desired level even after the tread has started to wear.

The cap layer can be made of a conventional tread rubber of winter tires. The cap layer can comprise or consist of a cap rubber, known by a person skilled in the art. The cap layer can comprise, e.g., NR, BR, SBR, carbon black, silica, resin, oil etc., as known by a person skilled in the art.

The hardness of the cap layer 23 of the studded tire can range, for example, from 48 to 60 ShA, more preferably from 50 to 58 ShA, and most preferably from 52 to 57 ShA, measured at 22° C. Technical effect is that the performance characteristics of the tire are particularly good for winter driving conditions. Further, the grip properties of such a tire can improve when the ambient temperature is above the freezing point.

Electrical Conductivity

When the tire 1 is used, a path of increased electrical conductivity can be provided from the first bead region to the surface 200 at least partly via the tread. Thus, preferably, the tire has a path of increased electrical conductivity through the tread.

The intermediate layer can comprise electrically conductive rubber material. In this embodiment, the intermediate layer can extend to the running surface of the tire. Technical effect is to improve electrical conductivity and handling properties of the tire without substantially affecting other properties of the tire, while supporting the studs on the underlayer.

However, in an embodiment, the tire does not have the intermediate layer, or the intermediate layer is not extending to the running surface. In this embodiment, the discharge of static electricity of the tire to the ground can be arranged in another way.

The underlayer can comprise electrically conductive rubber material. In this embodiment, the underlayer can extend to the running surface of the tire, providing the path of increased electrical conductivity through the tread.

In addition, on alternatively to the previously discussed alternatives, the tire can comprise a rubber member comprising electrically conductive rubber material. The rubber member can form a part of the outer surface of the tire. The rubber member can be an electrically conductive portion extending through the cap layer 23 to the outer surface of the tread.

The electrically conductive rubber material, and thus the electrically conductive portion, such as the underlayer extending to the running surface of the tire, can have a desired conductivity for obtaining a path of increased electrical conductivity from the bead region to the running surface of the tread.

Thanks to the electrically conductive portion, resistivity from the bead region to the running surface of the tire can be less than 500 MΩ by using 500 VDC, determined according to standard W.d.K 110 (Measurement of the Electrical Resistance of Tires).

The electrically conductive rubber material can form from 0.02% to 25% of the running surface area, preferably from 0.05% to 22.5% of the running surface area, and more preferably from 0.1% to 20% of the running surface area of the tire. Thus, it is possible to improve conductivity through the tread without affecting too much other properties of the tire.

Thus, the electrically conductive rubber material can be arranged to discharge static electricity of the tire to the ground. Thanks to the electrically conductive rubber material extending to the running surface of the tire, a resistance through the whole tire (from the bead region to the running surface), can be substantially low. The smaller the resistance, the better for the tire.

Studs

As discussed, the tread 20 is provided with studs 10. Each stud can be arranged in a stud hole provided in the tread.

Each stud can be arranged in a place wherein the stud hole is surrounded by the underlayer and the cap layer. If the tire comprises the intermediate layer, each stud can be arranged in a place wherein the stud hole is surrounded by the underlayer, the intermediate layer and the cap layer.

Studs can be installed to the tire by embedding the bottom flange and the waist of a stud into a hole for a stud, formed in the tire. The bottom flange of the stud is preferably placed in the bottom area of the hole for the stud, and the waist extends from it outwards, towards the surface of the tire. Thus, a stud 10 can be placed on said underlayer so that it is partly embedded in the underlayer.

The outer surface of the underlayer can be arranged, at least partly, below the bottom flange of the stud so that the bottom of the stud retracts partly into the underlayer during the use of the studded tire. In this embodiment, the properties of the studded tire can be more predictable. Furthermore, the stud can efficiently retract into the underlayer when in contact with the road, so that the damping effect of the underlayer can be more pronounced.

The stud 10 can comprise a bottom flange 14 of the stud 10 arranged to be placed in the bottom section of a hole for a stud. The body of the stud can comprise a bottom flange 14, a waist 13 extending away from the bottom flange 14, and an upper flange 12. Furthermore, the stud typically comprises a stud pin 11 fastened to the body.

The pin 11 of the stud may be made of a material different from said body of the stud.

The pin of the stud may be made of, for example, hard metal or hard ceramic.

The body of the stud 10 may be made, for example, by cold working of the shape from a circular wire preform which can be forced to a desired shape in a number of different steps. A hard metal pin, if used, can be made, for example, by compressing a preform from hard metal powder together with a binder, and by sintering it at a high temperature. Such a stud is assembled, for example, by pressing the hard metal pin into the stud body, whereby a strong friction joint is formed between them. The stud may be particularly suitable for use with such a pin of a stud that is made of a hard metal or ceramic based material.

The total length of the stud may be, for example, between 9 mm and 15 mm. For example for cars, the total length of the stud may be e.g., between 9 and 12 mm. The length of the stud can affect some properties of the stud and the tire.

The stud may comprise a bottom flange of the stud, whose cross-sectional dimension, such as a diameter or a diagonal, can be at least 3.5 mm and not greater than 10 mm, preferably between 4 and 9 mm and most preferably between 5 and 8.5 mm. The diameter of the bottom flange is measured at the greatest dimension of the cross-section of the bottom flange. Said diameter of the bottom flange can improve the controllability of the dynamic impact. Furthermore, such an area of the bottom flange of the stud can be particularly advantageous for use in combination with an underlayer.

In an example, the pin of a stud can be arranged to protrude not more than 1.7 mm, preferably not more than 1.5 mm and still more preferably not more than 1.2 mm, and most preferably equal to or less than 1 mm, from the tread of the tire at an ambient temperature of 20° C., determined so that the stud to be measured is not in contact with a surface 200.

The surface area of the cross-section of the pin of the stud may range from 1.5 mm$^2$ to 7.0 mm$^2$, from 2 mm$^2$ to 6 mm$^2$ more preferably from 3.2 mm$^2$ to 5 mm$^2$. Such an area of the pin of the stud may be particularly advantageous for use in combination with the underlayer and the intermediate layer.

The bottom of the stud may be provided with an air space which can enable better retraction of the stud into the tread when in contact with a road, reducing the dynamic impact of the stud, the dynamic impact, and road wear. In an example, the underlayer can, in the rest position of the stud, touch e.g., 60 to 100% of the bottom area of the stud, or e.g., 70 to 90% of the bottom area of the stud. In such a case, the advantages of the underlayer can be pronounced. For example, the control of the grip properties of the tire can be improved by using an air space arranged at the bottom of the stud, as well as a underlayer which is contact with said section of the bottom area of the stud.

Thus, in an example, the lower surface of the bottom flange of the stud 10 can be provided with a notch which forms an air space either between the bottom of the stud 10 and the underlayer 21. Said notch may provide the underlayer 21 with space to expand, whereby the properties of the stud can be more controllable at various temperatures.

The grip of the tire can be improved by using sufficiently many studs. The grip of the tire can be improved by using sufficiently many studs on both sides of the circumferential central line CL.

The tread 20 can have a circumference. The circumference can be measured along the circumferential central line CL. The circumferential central line CL is arranged in an equatorial plane EP of the tire 1. The equatorial plane EP of the tire 1 divides the tire to two equally large parts.

The tread 20 can be provided with a total number N10 of studs 10.

A ratio (N10/(20W×CL)) of the total number of the studs N10 to the width of the tread 20W and the circumference of the tread CL can be more than 2.8 pieces per square-decimeter (pcs/dm$^2$), preferably from 2.8 to 8.8 pcs/dm$^2$, more preferably from 3.8 to 7.8 pcs/dm$^2$, and most preferably from 4.4 to 6.5 pieces per square-decimeter.

Thus, in an embodiment, $$8.8 \text{ pcs/dm}^2 \geq N10/(20W \times CL) \geq 2.8 \text{ pcs/dm}^2$$

wherein

N10 is a total number of studs in the tire, 20W is the width of the tread (dm), and CL is circumference of the tire (dm, measured along the circumferential central line). Technical effect is that said number is particularly advantageous for tires having the intermediate layer and the underlayer for improving ice grip and reducing road wear.

The width 20W of the tread can be determined as follows:

The width 20W (i.e., that of the tread) may be equal to the reference tread width as defined in the ETRTO standards manual 2023 (see Design Guide, Page PC.7). In accordance with the definitions therein, the reference tread width C is calculatable as $$C = (1.075 - 0.005ar)s^{1.001}$$

Herein s is the Section Width (defined below), i.e., the width of the tyre, and ar is the nominal aspect ratio, which is readable from the size marking w/hRr, the "h" indicating the aspect ratio. Thus, the width 20W of the tread 20 may equal the value C as calculatable with the equation given above, wherein s equals the width of the tyre.

Within this description, the width of the tyre, refers to the "Section Width" as defined in the Standards Manual 2023 of the European Tyre and Rim Technical Organization (ETRTO).

Correspondingly, the Section Width (see Table 2 below), i.e., the width of the tyre as defined herein (and in the ETRTO standards manual) is the linear distance between the outsides of the sidewalls of an inflated tyre excluding elevations due to labelling (markings), decoration, or protective bands or ribs.

In practice, the tyre width is related to the size marking shown on the tyre. In general, the size marking is shown on a tyre as w/hRr, wherein w denotes a width, h an aspect ratio and r a radius. According to the ETRTO standards manual, typical size markings refer to Design Width (i.e., the width W200 of the tyre 200) and an overall diameter as shown in the Table 1 below:

It is noted that Table 2 shows only some examples. A tyre may have a different size, in particular another aspect ratio than 55.

TABLE 2

| | | | | | | | | |
|---|---|---|---|---|---|---|---|---|
| Tyre width and diameter indicated by a size marking of a tyre. | | | | | | | | |
| Size | Section Width (mm) | Overall Diameter (mm) | Size | Section Width (mm) | Overall Diameter (mm) | Size | Section Width (mm) | Overall Diameter (mm) |
| 145/55R16 | 150 | 566 | 205/55R15 | 214 | 607 | 255/55R16 | 265 | 686 |
| 155/55R14 | 162 | 526 | 205/55R16 | 214 | 632 | 255/55R17 | 265 | 712 |
| 155/55R16 | 162 | 576 | 205/55R17 | 214 | 658 | 255/55R18 | 265 | 737 |

TABLE 2-continued

Tyre width and diameter indicated by a size marking of a tyre.

| Size | Section Width (mm) | Overall Diameter (mm) | Size | Section Width (mm) | Overall Diameter (mm) | Size | Section Width (mm) | Overall Diameter (mm) |
|---|---|---|---|---|---|---|---|---|
| 165/55R14 | 170 | 538 | 205/55R18 | 214 | 683 | 255/55R19 | 265 | 763 |
| 165/55R15 | 170 | 563 | 205/55R19 | 214 | 709 | 255/55R20 | 265 | 788 |
| 175/55R15 | 182 | 573 | 215/55R16 | 226 | 642 | 255/55R21 | 265 | 813 |
| 175/55R16 | 182 | 598 | 215/55R17 | 226 | 668 | 265/55R18 | 277 | 749 |
| 175/55R17 | 182 | 624 | 215/55R18 | 226 | 693 | 265/55R19 | 277 | 775 |
| 175/55R18 | 182 | 649 | 215/55R19 | 226 | 719 | 265/55R20 | 277 | 800 |
| 175/55R20 | 182 | 700 | 225/55R16 | 233 | 654 | 275/55R15 | 284 | 683 |
| 185/55R14 | 195 | 560 | 225/55R17 | 233 | 680 | 275/55R16 | 284 | 708 |
| 185/55R15 | 195 | 585 | 225/55R18 | 233 | 705 | 275/55R17 | 284 | 734 |
| 185/55R16 | 195 | 610 | 225/55R19 | 233 | 731 | 275/55R18 | 284 | 759 |
| 195/55R15 | 201 | 595 | 235/55R16 | 245 | 664 | 275/55R19 | 284 | 785 |
| 195/55R16 | 201 | 620 | 235/55R17 | 245 | 690 | 275/55R20 | 284 | 810 |
| 195/55R17 | 201 | 646 | 235/55R18 | 245 | 715 | 275/55R21 | 284 | 835 |
| 195/55R18 | 201 | 671 | 235/55R19 | 245 | 741 | 285/55R18 | 297 | 771 |
| 195/55R19 | 201 | 697 | 235/55R20 | 245 | 766 | 285/55R19 | 297 | 797 |
| 195/55R20 | 201 | 722 | 245/55R16 | 253 | 676 | 305/55R20 | 316 | 855 |
| 195/55R21 | 201 | 747 | 245/55R17 | 253 | 702 | 325/55R22 | 336 | 917 |
|  |  |  | 245/55R18 | 253 | 727 |  |  |  |
|  |  |  | 245/55R19 | 253 | 753 |  |  |  |

Dynamic Impact of the Stud

The bottom flange 14 of the stud, together with the underlayer 21, can substantially determine the impact of the stud to the road.

When the outdoor temperature is above the freezing point, the relatively soft material of the underlayer can allow the stud to retract deeper inside the tire tread, reducing stud protrusion. Thus, the stud can also wear the road to a lesser extent. Moreover, noise caused by the tire can be substantially reduced. When the outdoor temperature decreases so that ice or snow may build up on the road, the material of the underlayer 21 can substantially harden, whereby the stud can efficiently protrude into the icy surface, improving the ice grip properties of the tire.

If the tire comprises the intermediate layer, the harder material of the intermediate layer can support the stud, further improving properties of the studded tire.

The shape of the bottom flange of the stud together with the underlayer 21 can be designed to increase the dynamic impact of the stud in cold temperatures.

The underlayer can be arranged so that the stud 10 is, in road contact, pressed against the underlayer 21. Technical effect is to have an effective impact on the grip properties of the tire on an icy road.

The stud can be in direct contact with the outer surface of the underlayer 21. Thus, the bottom flange of the stud can be arranged in connection with the outer surface of the underlayer 21 so that the stud is pressed against the underlayer 21 during driving on a road. If the underlayer is made of a relatively hard material, a relatively great force is needed for pressing the stud substantially into the tire during driving on a road. Such a great dynamic impact can cause substantial wear of the road surface, as well as increased tire noise. Therefore, when driving on a non-frozen road surface, the underlayer under the stud would preferably be a relatively soft material, whereby a lesser force is needed for pressing the pin of the stud substantially into the tire.

The underlayer can comprise or consist of a material which is soft at room temperature and thereby reduces wear of the road surface caused by the tire under non-frozen conditions. Hardening of the underlayer can increase the dynamic impact of the stud, because the stud thus cannot substantially retract into the tire, whereby the penetration of the stud into the ice is greater and the grip of the tire can be significantly better. Under warm conditions, the underlayer can substantially soften, whereby the softening underlayer can allow the retraction of the stud body into the tire, whereby it can reduce the dynamic impact of the stud and thereby reduce the wear of the road.

Manufacturing Method

FIGS. 2a1, 2a2, and 2b to 2d illustrates some example method steps for manufacturing a tire, comprising steps for producing an annular carcass 410.

Referring to FIGS. 2a1 and 2a2, a pneumatic tire 100 can be manufactured by winding first and second ply materials 812, 822 comprising aramid onto a carcass drum 300 to form the first and second plies 712 and 722, respectively.

An embodiment comprises winding at least a layer of the first ply material 812 and a layer of the second ply material 822 onto a carcass drum 300 such that the transversal direction ST is parallel to the axis of rotation AX of the tire drum 300. Preferably, the first ply material 812 radially surrounds the second ply material 822. Furthermore, to increase the strength, the third angle $\alpha3$ is preferably a sum of the first angle $\alpha1$ and the second angle $\alpha2$.

As indicated in FIG. 2a1, the first ply material 812 and the second ply material 822 may be wound substantially simultaneously, e.g. as a layer comprising both the ply materials. However, this embodiment may not be preferred as this method may decrease properties of the obtained tire.

Preferably, and as indicated in FIG. 2a2, the first ply material 812 can be wound onto the second ply material 822, after first winding the second ply material 822. Thus, the ply materials 812, 822 may be wound in such a way that the second ply material 822 is wound first, and the first ply material 812 is wound onto the second ply material.

By said winding, a tubular carcass preform 400 can be formed.

FIG. 2c indicates, how the first ply material 812 can radially surround the second ply material 822. In an embodiment, the first ply material 812 is next to the second ply material 822 in the radial direction at the tread 20.

After winding the material, two cables 153, 154 can be arranged onto the tubular carcass preform 400.

Referring to FIGS. 2b to 2d, two cables 153, 154 can be arranged onto the tubular carcass preform 400. The parts of the tubular carcass preform 400 that are left in between a boundary 402, 404 of the tubular carcass preform 400 and the one of the two cables 153, 154 that is closer to the corresponding boundary 402, 404 of the tubular carcass preform can be turned about the closer cable 153, 154 onto the part of the tubular carcass preform 400 that is left in between the two cables 153, 154.

Thereafter, the tubular carcass preform 400 can be expanded to form an annular carcass 410 (shown in FIG. 2d).

The innerliner 131 and the sidewalls 132, 134 can be formed from rubber based compound(s).

Further, a preassembly of belts and a tread 450 comprising metal belt(s), optionally at least one textile belt, the underlayer, optionally, the intermediate layer, and the cap layer can be arranged onto the annular carcass 410 to form a preform (i.e., green tire) 460 for a tire 100.

By vulcanizing the preform 460 for a tire, a pneumatic tire 100 can be manufactured, as known to a skilled person. The preform 460 for a tire can be vulcanized using a temperature and time known per se.

Stud holes can be formed e.g. during the vulcanization.

Finally, after vulcanizing the preform, the method can comprise a step of installing studs.

Thus, the method for manufacturing the tire can comprise:

providing a first web of a first ply material 812, the first web extending in a longitudinal direction SL, having a first width W1 in a transversal direction ST perpendicular to the longitudinal direction SL, and comprising first cords 814 extending in a first direction forming a first angle α1 of at least 0 degrees and at most 10 degrees with the transversal direction ST.

The method for manufacturing the tire can further comprise:

providing a second web of a second ply material 822, the second web extending in the longitudinal direction SL, having a second width W2 in the transversal direction ST, and comprising second cords 824 extending in a second direction forming a second angle α2 of more than 0 degrees and at most 10 degrees with the transversal direction ST, wherein a third angle between the first direction and the second direction is from X to Y.

The method for manufacturing the tire can particularly comprise at least the following steps:

forming onto the annular carcass comprising at least one ply and cables 153, 154, forming a preassembly of belts and a tread 450 comprising at least one metal belt 286, 287, underlayer 21, and a cap layer 23, arranging the preassembly of belts and a tread onto the annular carcass, vulcanizing the tire, and installing anti-skid studs 10.

The ply materials comprising the aramid based cords can be provided in the form of a single web or, for example, a web for each ply material, from which pieces of suitable length are cut. In the alternative, the ply material comprising the aramid based cords may be provided in the form of pre-cut sheets. In both cases, in tubular carcass preform 400, the first ply material 812 can radially surround in all locations of the second ply material 822 as indicated in FIGS. 2b and 2c.

The part of the tubular carcass preform 400 that is left in between a first boundary 402 of the tubular carcass preform 400 and the first cable (i.e., the one of the two cables that is closer to the first boundary 402 of the tubular carcass preform) can be turned about the first cable 153 onto the part of the tubular carcass preform 400 that is left in between the two cables 153, 154. In this way, the bead area 415 (corresponding to bead area 151) is formed.

Also the part of the tubular carcass preform 400 that is left in between a second boundary 404 of the tubular carcass preform 400 and the second cable 154 (i.e., the of the two cables that is closer to the second boundary 404 of the tubular carcass preform) is turned about the second cable 154 onto the part of the tubular carcass preform 400 that is left in between the two cables 153, 154. In this way, another bead area 415 (corresponding to the bead area 152) is formed.

The tubular carcass preform 400 can be expanded to form an annular carcass 410 as shown in FIG. 2d.

The tubular carcass preform 400 may be expanded before the boundary parts of the tubular carcass preform 400 are turned. In the alternative, the tubular carcass preform 400 may be expanded after the boundary parts of the tubular carcass preform 400 are turned. In the alternative, the tubular carcass preform 400 may be expanded substantially simultaneously with the turning of the boundary parts of the tubular carcass preform 400.

At least one metal belt 286, 287 can be arranged onto the annular carcass. Preferably, two metal belts are arranged onto the annular carcass. Furthermore, at least one textile belt can be arranged onto the outermost metal belt.

The underlayer 21 can be arranged onto outermost belt 284, 286, 287. Further, a cap layer 23 can form at least part of the tread 20.

In an embodiment, an intermediate layer 22 can be arranged between the cap layer 23 and the underlayer 21.

Thus, the tire according to this specification is a studded pneumatic tire comprising the ply/plies comprising cords comprising aramid, at least one metal belt, preferably, a textile belt, the underlayer 21, optionally, the intermediate layer 22, and the cap layer 23.

Technical effect is to decrease road wear by using the underlayer 21, and improve handling properties (which may be decreased due to the underlayer) into desired level while maintaining the obtained reduced road wear.

Experimental Tests

Several studded pneumatic tires were manufactured, and their properties were determined during experimental tests.

The plies can be obtained according to this specification. An example for producing the underlayer and the optional intermediate layer is given in Example 1 (below).

Example 1—Preparation of the Underlayer and the Intermediate Layer

Table 3 discloses, as an example, raw materials of the underlayer and the intermediate layer for one of the manufactured tires.

TABLE 3

| | Materials of an underlayer and an intermediate layer for one of the manufactured tires | |
| --- | --- | --- |
| Raw materials | Underlayer (phr) | Intermediate layer (phr) |
| SSBR (58% vinyl, 34% styrene) | 50 | — |
| ESBR (16% vinyl, 23% styrene) | — | 40 |
| NR | 30 | 40 |
| BR | 20 | 20 |
| Oil (TDAE) | 20 | 9 |
| Resin, Tg 39° C. | 30 | — |
| Carbon black, N375 | 40 | 60 |
| Zinc oxide (ZnO) | 3 | 3 |
| Stearic acid | 2 | 1 |
| 6PPD (N-(1,3-Dimethylbutyl)-N'-phenyl-p-phenylenediamine) | 1 | 1 |
| TMQ (2,2,4-Trimethyl-1,2-dihydroquinoline) | 1 | 1 |
| Sulphur | 1.40 | 1 |
| CBS (N-Cyclohexyl-2-benzothiazole sulfenamide) | 1.40 | 2.90 |
| ZBEC (Zinc bis(dibenzyldithiocarbamate)) | 0.25 | — |

The rubber mixtures were obtained by means of a stepwise mixing process. A 2 L-internal mixer (Krupp Elastomertechnik GK 1,5 laboratory mixer) was used to add the compounds.

In the first step, the polymers were added and mixed for 40 seconds. In the second step, part of the carbon black and chemicals were added and mixed for 60 seconds. In the third step, the rest of the carbon black and oil were added and mixed for 90 seconds or temperature in mixing chamber received 150 degrees.

The final step with curing chemicals was performed at 95° C. for 50 seconds.

DMTA samples were vulcanized at 150° C. by using a pressure of 150 bar. The optimum vulcanization time of t90 (at 150° C.) was determined with a moving die rheometer according to ASTM D5289/1995. A vulcanization time of t90 plus 5 min was used for the samples.

Example 2—Hardness Measurements from Tires

For measuring hardness from tires, tire cut samples were taken from different tires.

The samples to be measured were taken from the tire cut samples. For measurements, each sample was attached to a support for stabilizing the samples during measurements. For precise measurements, the samples were attached to the support by using glue. Thus, the samples were firmly attached to the support during the hardness measurements.

Thickness of each sample was 5 mm. The samples were tempered (according to Table 1) before measuring the hardness.

Hardness (ShA) at 22° C. and −25° C. were determined from the obtained samples. Test results are shown in Tables 4 and 5. The ShA-hardness of each sample was determined by placing the sample to be measured under a durometer. For measurements, each sample was moved so that a piston of the durometer tested a predetermined test area of the sample.

TABLE 4

| Hardness measurements from tires, measured at 22° C. | | | |
| --- | --- | --- | --- |
| measurements at 22° C. | sample 1 | sample 2 | sample 3 |
| 1 | 64.1 | 67.4 | 45.9 |
| 2 | 63.8 | 68.2 | 45.2 |
| 3 | 63.5 | 67.1 | 45.3 |
| 4 | 61.1 | 69 | 44.6 |
| 5 | 61.2 | 69.8 | 44.8 |
| average | 62.7 | 68.3 | 45.2 |

TABLE 5

| Hardness measurements from tires, measured at −25° C. | | | |
| --- | --- | --- | --- |
| measurement at −25° C. | sample 1 | sample 2 | sample 3 |
| 1 | 67.1 | 70.6 | 80 |
| 2 | 63.6 | 71.2 | 80.1 |
| 3 | 66.8 | 71.5 | 78.9 |
| 4 | 63.5 | 72.4 | 76.4 |
| 5 | 66.3 | 70.9 | 81.3 |
| 6 | 63.2 | 71.5 | 82.4 |
| 7 | 66.9 | 69.4 | 78.1 |
| 8 | 62.8 | 70.9 | 76.3 |
| average | 65.0 | 71.1 | 79.2 |

These hardness measurements demonstrate how different rubber compounds can behave when temperature is dropping. The measured hardness of the sample 1 (as well as the hardness of the sample 2) was increased about 2 Shore A units (sample 1: 62.7 to 65.0 and sample 2: 68.3 to 71.1), while the hardness of sample 3 changed 34 Shore A units (45.2 to 79.2).

The invention has been described with the aid of illustrations and examples. The invention is not limited solely to the above presented embodiments but may be modified within the scope of the appended claims.

What is claimed is:

1. A method for manufacturing a studded pneumatic tire, the method comprising producing an annular carcass by providing a first ply material, the first ply material extending in a longitudinal direction, having a first width in a transversal direction perpendicular to the longitudinal direction, and comprising first cords extending in a first direction forming a first angle of at most 10 degrees with the transversal direction, wherein the first cords comprise aramid, aramid content of the first cords being at least 45 wt. % of total weight of the first cords, winding at least a layer of the first ply material onto a carcass drum such that the transversal direction is parallel to the axis of rotation of the carcass drum, thereby forming a cylindrical carcass preform, arranging two cables to the cylindrical carcass preform, and expanding the preform, thereby forming the annular carcass, forming a preassembly of belts and a tread comprising at least one metal belt, an underlayer, a cap layer, and an intermediate layer, arranged, at least partially, between the underlayer and the cap layer, wherein hardness of the intermediate layer is at least 10% greater than hardness of the underlayer, determined at 22° C. as Shore A hardness, and the underlayer is harder than the intermediate layer, determined at −25° C. as Shore A hardness, arranging the preassembly of belts and a tread onto the annular carcass to form a preform, vulcanizing the preform, and installing studs, wherein the intermediate layer is configured to support a body of a stud together with the cap layer.

2. The method according to claim 1, wherein the steps of producing the annular carcass further comprise:

providing a second ply material, the second ply material extending in the longitudinal direction, having a second width in the transversal direction, and comprising second cords extending in a second direction forming a second angle of at most 10 degrees with the transversal direction, wherein the second cords comprise aramid, aramid content of the second cords being at least 45 wt. % of total weight of the first cords, and winding at least a layer of the second ply material onto a carcass drum so that the second direction forms a third angle with the first direction, wherein the third angle is less than 20 degrees.

3. A studded pneumatic tire, wherein the tire comprises sidewalls, and bead areas, wherein cables are arranged in the bead areas, the tire further comprising a carcass having a first ply material, wherein the first ply material comprises first cords extending within the first ply material in a first direction that depends on a location within the tire, wherein the first direction forms a first angle with the direction of the axis of rotation in the tread, wherein the first angle is at most 10 degrees, wherein the first cords comprise aramid, aramid content of the first cords being at least 45 wt. % of total weight of the first cords, and wherein the tire further comprises at least one metal belt on the outermost ply layer, an underlayer on the outermost belt layer, and a tread provided with anti-skid studs, wherein the tire comprises an intermediate layer arranged, at least partially, between the underlayer and a cap layer, wherein the intermediate layer is configured to support a body of an anti-skid stud together with the cap layer, wherein hardness of the intermediate layer is at least 10% greater than hardness of the underlayer, determined at 22° C. as Shore A hardness, and the underlayer is harder than the intermediate layer, determined at −25° C. as Shore A hardness.

4. The tire according to claim 3, further comprising a second ply material arranged in such a way that the first ply material radially surrounds the second ply material in the tread, wherein the second ply material comprises second cords extending within the second ply material in a second direction at the location within the tread, the second direction forming a second angle with the direction of the axis of rotation and the second direction forming a third angle with the first direction, wherein the second angle is at most 10 degrees, and the third angle is at most 20 degrees, and wherein the second cords comprise aramid, aramid content of the second cords being at least 45 wt. % of total weight of the second cords.

5. The tire according to claim 3, wherein dynamic stiffness (E*, MPa) of the underlayer is configured to be from 5 MPa to less than 25 MPa, determined at 20° C., and dynamic stiffness (E*, MPa) of the underlayer, determined at 0° C., is configured to be at least 2 times the dynamic stiffness of the underlayer determined at 20° C., determined according to standard ISO 4664-1:2011 in compression.

6. The tire according claim 3, wherein the dynamic stiffness (E*, MPa) of the underlayer is configured to be from 5 MPa to less than 25 MPa, determined at 20° C., and the dynamic stiffness (E*, MPa) of the underlayer determined at −25° C., is configured to be at least 20 times the dynamic stiffness of the underlayer determined at +20° C., determined according to standard ISO 4664-1:2011 in compression.

7. The tire according to claim 3, wherein a position of a tan delta maximum of the underlayer is configured to be between −10° C. and +15° C., determined according to ISO 4664-1:2011 in compression.

8. The tire according to claim 3, wherein an average thickness of the underlayer is at least 0.5 mm and not greater than 8 mm.

9. The tire according to claim 3, wherein the underlayer comprises natural rubber (NR) from 0 to 50 phr, and/or butadiene rubber (BR) from 0 to 30 phr, and/or synthetic isoprene rubber (IR) from 0 to 50 phr, a total amount of said rubbers (natural rubber, butadiene rubber and synthetic isoprene rubber) being from 0 to 70 phr, solution polymerized styrene-butadiene rubber (SSBR) from 30 to 100 phr, reinforcing fillers from 5 to 70 phr, and one or more resins from 5 to 40 phr.

10. The tire according to claim 3, wherein the aramid is selected from para-aramids.

11. The tire according to claim 3, wherein the first ply material further comprises a coating, and a content of the coating is from 2 to 6% by weight, determined from a total weight of the first cords of the first ply material.

12. The tire according to claim 3, wherein the tire comprises a second ply material, the second ply material comprising aramid based cords and a coating, wherein a content of the coating is from 2 to 6% by weight, determined from a total weight of the cords of the second ply material.

13. The tire according to claim 3, wherein a dynamic stiffness of the intermediate layer is configured to be from 25 to 100 MPa, determined at a temperature of 20° C., and at a temperature of 0° C., the dynamic stiffness (E*, MPa) is configured to be from 1 to 1.5-times said dynamic stiffness of the intermediate layer determined at the temperature of 20° C., determined according to the standard ISO 4664-1:2011 in compression.

14. The tire according to claim 3, wherein the first cords comprise polyethylene terephthalate (PET), a content of polyethylene terephthalate (PET) being equal to or less than 50 wt. % of total weight of the first cords.

15. The tire according to claim 3, wherein a total content of aramid and polyethylene terephthalate (PET) is at least 90 wt. % of total weight of the first cords.

16. The tire according to claim 3, wherein hardness (ShA) of the underlayer is configured to be in a range between 45 ShA and 65 ShA, determined at an ambient temperature of 22° C. according to standard ASTM D2240-15.

* * * * *